US012146675B2

(12) United States Patent
Oh et al.

(10) Patent No.: US 12,146,675 B2
(45) Date of Patent: Nov. 19, 2024

(54) AIR CONDITIONER AND METHOD OF CONTROLLING THE SAME

(71) Applicant: SAMSUNG ELECTRONICS CO., LTD., Suwon-si (KR)

(72) Inventors: Seung Won Oh, Suwon-si (KR); Chi Wook Gu, Suwon-si (KR); Young Hoon Kim, Suwon-si (KR); Tae Woo Kim, Suwon-si (KR); Hyeong Joon Seo, Suwon-si (KR); Sun-Hee Son, Suwon-si (KR); Hae Gyun Shin, Suwon-si (KR); Jeong Kyo Oh, Suwon-si (KR); Hyo-Shin Lee, Suwon-si (KR); Il Yong Cho, Suwon-si (KR); Hyoung Seo Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 610 days.

(21) Appl. No.: 17/376,882

(22) Filed: Jul. 15, 2021

(65) Prior Publication Data
US 2021/0341169 A1 Nov. 4, 2021

Related U.S. Application Data

(63) Continuation of application No. PCT/KR2020/000508, filed on Jan. 10, 2020.

(30) Foreign Application Priority Data

Jan. 15, 2019 (KR) ........................ 10-2019-0005089

(51) Int. Cl.
*F24F 11/77* (2018.01)
*F24F 1/0014* (2019.01)
(Continued)

(52) U.S. Cl.
CPC ............ *F24F 11/77* (2018.01); *F24F 1/0014* (2013.01); *F24F 13/222* (2013.01)

(58) Field of Classification Search
CPC ...... F24F 1/0003; F24F 1/0007; F24F 1/0011; F24F 1/0014; F24F 1/0018; F24F 1/0033; F24F 11/74; F24F 11/77
See application file for complete search history.

(56) References Cited

U.S. PATENT DOCUMENTS 6,141,979 A * 11/2000 Dunlap .................. F24F 3/044
62/271
11,193,677 B2 12/2021 Ha et al.
(Continued)

FOREIGN PATENT DOCUMENTS

CN 1902447 A 1/2007
CN 101903706 A 12/2010
(Continued)

OTHER PUBLICATIONS

Chinese Office Action dated Jul. 5, 2022 in Chinese Patent Application No. 202080009506.2 ( 9 pages; 8 pages English translation).
(Continued)

*Primary Examiner* — Frantz F Jules
*Assistant Examiner* — Jason N Thompson
(74) *Attorney, Agent, or Firm* — STAAS & HALSEY LLP

(57) ABSTRACT

An air conditioner including: a housing having a discharge port and a plurality of holes; a door capable of closing the discharge port; a heat exchanger provided in the housing; a compressor connected to the heat exchanger so as to circulate a refrigerant so that same passes through the heat exchanger; a fan for blowing air so that the air passes through the heat exchanger and is discharged through the discharge port and at least one of the plurality of holes. The
(Continued)

air conditioner includes a humidity sensor provided inside the housing so as to sense the humidity of the air having passed through the heat exchanger; and a control unit for controlling the door so as to open or close the discharge port and rotating the fan, on the basis of the humidity sensed by the humidity sensor when the compressor has been stopped.

11 Claims, 19 Drawing Sheets

(51) Int. Cl.
*F24F 1/0018* (2019.01)
*F24F 1/0033* (2019.01)
*F24F 1/0083* (2019.01)
*F24F 11/74* (2018.01)
*F24F 13/22* (2006.01)

(56) References Cited

U.S. PATENT DOCUMENTS

| | | | | |
|---|---|---|---|---|
| 2003/0188547 A1* | 10/2003 | Jeon | ............... | F25D 17/045 62/126 |
| 2010/0170281 A1* | 7/2010 | Kamino | ............... | F24F 3/1429 62/271 |
| 2017/0023264 A1* | 1/2017 | Ha | ............... | F24F 11/46 |
| 2017/0096048 A1* | 4/2017 | Larson | ............... | B60H 1/00785 |
| 2019/0271497 A1* | 9/2019 | Guanye | ............... | F25B 5/00 |

FOREIGN PATENT DOCUMENTS

| | | |
|---|---|---|
| CN | 107003027 A | 8/2017 |
| JP | 2003-247740 | 9/2003 |
| JP | 2005-291570 | 10/2005 |
| JP | 2016-118371 A | 6/2016 |
| KR | 97 0066363 | 10/1997 |
| KR | 1999-004175 A | 1/1999 |
| KR | 10-0191510 B1 | 6/1999 |
| KR | 10-2008-0064017 A | 7/2008 |
| KR | 10-2017-0118666 | 10/2017 |
| KR | 10-2017-0140527 A | 12/2017 |
| KR | 10-1892475 B1 | 8/2018 |
| KR | 10-2020-0042566 A | 4/2020 |
| TW | 200933097 | 8/2009 |

OTHER PUBLICATIONS

Extended European Search Repot mailed Jan. 20, 2022 in European Patent Application No. 20741899.7 (10 pages).
Office Action dated Sep. 28, 2023 in corresponding Korean Patent Application No. 10-2019-0005089.
Office Action dated Apr. 27, 2023 in Chinese Patent Application No. 202080009506.2.
Office Action dated Apr. 28, 2023 in European Patent Application No. 20 741 899.7.
Office Action dated Jan. 18, 2023 in Chinese Patent Application No. 202080009506.2 (5 pages; 9 pages English Translation).
International Search Report for International Patent Application No. PCT/KR2020/000508 dated May 12, 2020.
European Office Action dated Mar. 26, 2024 for European Application No. 20741899.7.

* cited by examiner

AIR CONDITIONER AND METHOD OF CONTROLLING THE SAME

CROSS-REFERENCE TO RELATED APPLICATIONS

This application is a continuation application, under 35 U.S.C. § 111(a), of International Patent Application No. PCT/KR2020/000508, filed on Jan. 10, 2020, which claims the priority benefit of Korean Patent Application No. 10-2019-0005089, filed on Jan. 15, 2019 in the Korean Patent and Trademark Office, the disclosures of which are hereby incorporated by reference in their entirety.

BACKGROUND

Field

The present disclosure relates to an air conditioner and a method of controlling the same, and more particularly, to an air conditioner that performs a drying process of drying an interior of the air conditioner after performing a cooling process, and a method of controlling the same.

Description of the Related Art

In general, an air conditioner is an apparatus that uses transfer of heat generated in a process of evaporating and condensing refrigerant to cool or heat, air and discharge the cooled or heated air in order to condition air of an indoor space.

When performing a cooling process or a heating process, the air conditioner may circulate a refrigerant, rotate a fan provided near an indoor heat exchanger to suction in indoor air. In addition, the air conditioner may heat-exchange the suctioned air in the indoor heat exchanger and discharge the heat-exchanged air to the indoor space.

In addition, the air conditioner performs a drying process after the cooling process ends in order to remove condensed moisture from the indoor heat exchanger during the cooling process. The air conditioner may stop the circulation of refrigerant during the drying process, and rotate the fan provided near the indoor heat exchanger to drop the condensed moisture on the indoor heat exchanger or evaporate the moisture.

A conventional air conditioner rotates the fan at a high speed for a predetermined drying time for the drying process, thereby generating a large noise. In addition, a central part of the indoor heat exchanger dries quickly by air passing through it rapidly due to the high-speed rotation of the fan, while an edge of the indoor heat exchanger dries relatively slowly. Accordingly, because the edge of the indoor heat exchanger is not sufficiently dried, microorganisms such as mold may proliferate at the edge of the indoor heat exchanger and cause odor.

SUMMARY

An aspect of the present disclosure provides an air conditioner including: a housing having a discharge port and a plurality of holes; a door configured to close the discharge port; a heat exchanger provided in the housing; a compressor connected to the heat exchanger and configured to circulate a refrigerant to pass through the heat exchanger; a fan configured to blow air such that the air passes through the heat exchanger and is discharged through at least one of the discharge port and the plurality of holes: a humidity sensor provided in the housing and configured to detect a humidity of the air that has passed through the heat exchanger; and a controller configured, based on the humidity detected by the humidity sensor while the compressor is stopped, to control the door to open or close the discharge port and rotate the fan.

Another aspect of the present disclosure provides a method of controlling an air conditioner, the air conditioner including a housing having a discharge port and a plurality of holes. The method including: operating a compressor such that a refrigerant passes through a heat exchanger provided in the housing; rotating a fan such that air passes through the heat exchanger while the compressor is operating; stopping the compressor in response to a user input for stopping the compressor; and opening or closing the discharge port and rotating the fan based on a humidity detected by a humidity sensor that is provided in the housing and detects the humidity of the air passing through the heat exchanger while the compressor is stopped.

Another aspect of the present disclosure provides an air conditioner including: a housing; a heat exchanger provided in the housing; a compressor connected to the heat exchanger and configured to circulate a refrigerant to pass through the heat exchanger; a fan configured to blow air such that the air passes through the heat exchanger; a humidity sensor provided in the housing and configured to detect a humidity of the air that has passed through the heat exchanger; and a controller configured to rotate the fan at different rotation speeds based on the humidity detected by the humidity sensor while the compressor is stopped.

Additional aspects of the disclosure will be set forth in part in the description which follows and, in part, will be obvious from the description, or may be learned by practice of the disclosure.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
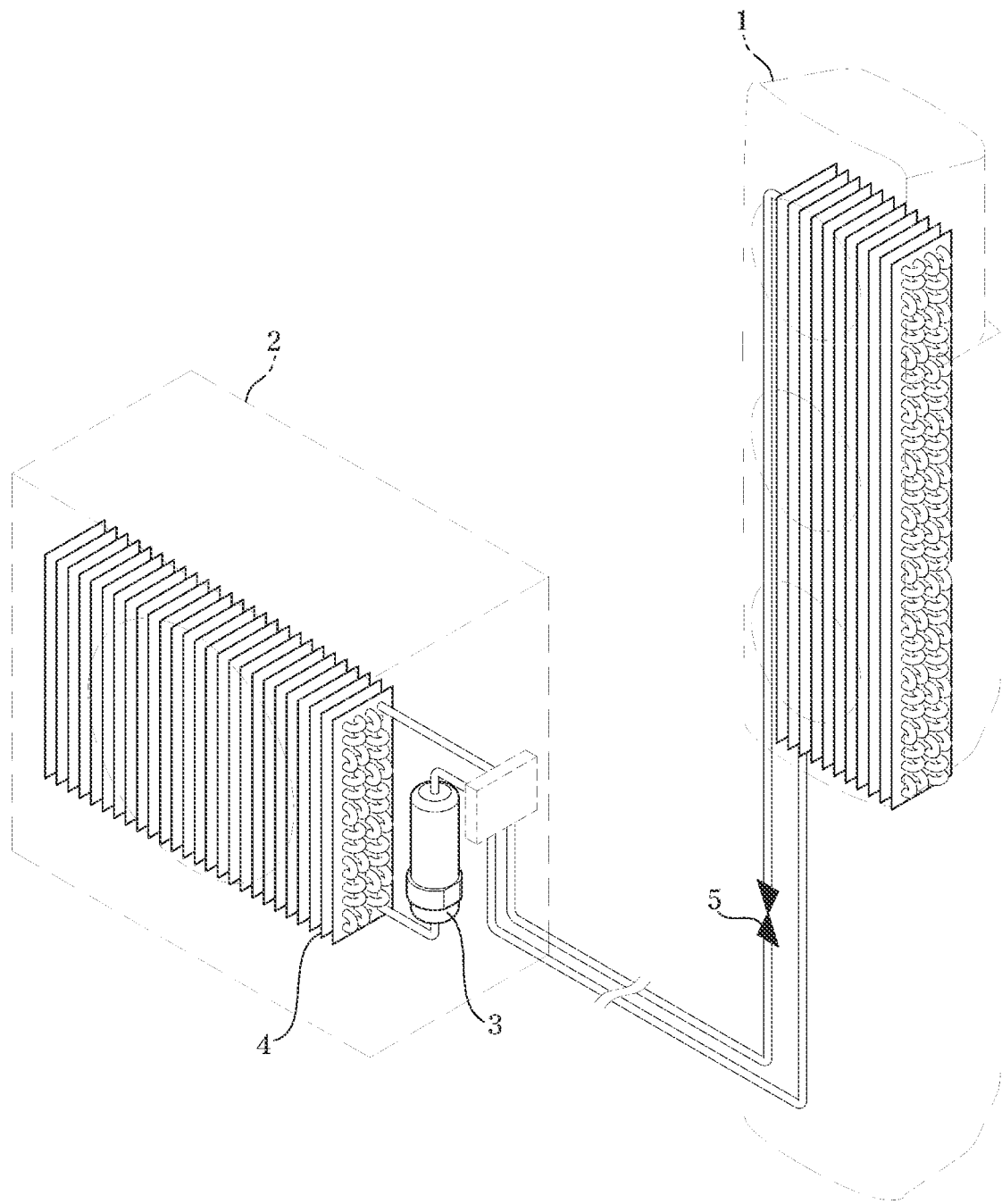
FIG. 1 is a view illustrating a refrigerant circulation circuitry of an air conditioning system according to an embodiment.

Like reference numerals refer to like elements throughout the specification. Not all elements of the embodiments of the disclosure will be described, and the description of what are commonly known in the art or what overlap each other in the exemplary embodiments will be omitted. The terms as used throughout the specification, such as "~ part," "~ module," "~ member," "~ block," etc., may be implemented in software and/or hardware, and a plurality of "~ parts." "~ modules," "~ members." or "~ blocks" may be implemented in a single element, or a single "~ part," "~ module," "~ member," or "~ block" may include a plurality of elements.

It will be further understood that the term "connect" and its derivatives refer both to direct and indirect connection, and the indirect connection includes a connection over a wireless communication network.

The terms "include (or including)" and "comprise (or comprising)" are inclusive or open-ended and do not exclude additional, unrecited elements or method steps, unless otherwise mentioned.

Furthermore, when it is stated that a layer is "on" another layer or substrate, the layer may be directly on another layer or substrate or a third layer may be disposed therebetween.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section.

It is to be understood that the singular forms "a," "an," and "the" include plural references unless the context clearly dictates otherwise.

Reference numerals used for method steps are merely used for convenience of explanation, but not to limit an order of the steps. Thus, unless the context clearly dictates otherwise, the written order may be practiced otherwise.

An aspect of the present disclosure is to provide an air conditioner capable of minimizing a noise due to rotation of a fan during a drying process.

Another aspect of the present disclosure is to provide an air conditioner capable of drying up to an edge of an indoor heat exchanger.

Another aspect of the present disclosure is to provide an air conditioner capable of controlling a drying operation according to an internal humidity.

According to an embodiment, an air conditioner capable of minimizing a noise of a drying process may be provided so that the user does not recognize the drying process by rotating a fan for blowing at a low speed during the drying process may be provided.

According to another embodiment, by rotating the fan at the low speed during the drying process, it is possible to provide an air conditioner capable of drying up to an edge of an indoor heat exchanger.

According to another embodiment, it is possible to provide an air conditioner capable of accurately controlling a drying operation based on an internal humidity by including a humidity sensor that measures a humidity inside the air conditioner.

Hereinafter, an operation principle and embodiments of the disclosure will be described with reference to accompanying drawings.

FIG. 1 is a view illustrating a refrigerant circulation circuitry of an air conditioning system according to an embodiment.

Referring to FIG. 1, an air conditioning system includes an indoor unit 1 and an outdoor unit 2.

The indoor unit 1 may be located in an air conditioning space. The air conditioning space represents a space to be cooled or heated by the air conditioner 1. The indoor unit 1 may be provided inside a space separated from an outside by a wall or a barrier film, such as an interior of a house or an office, for example.

The outdoor unit 2 may be located outside the air conditioning space. The outdoor unit 2 may be provided outdoors, for example.

The air conditioning system may include a refrigerant fluid path for circulating a refrigerant between indoors and outdoors. The refrigerant circulates between the indoors and the outdoors along the refrigerant fluid path, and may absorb a heat or discharge a latent heat during a change in state (e.g., the change in state from a gaseous state to a liquid state, a state change from the liquid state to the gaseous state).

In order to induce the change in state of the refrigerant, a refrigerant circulation device may include a compressor 3, an outdoor heat exchanger 4, an expansion valve 5, and an indoor heat exchanger 20.

The compressor 3 may compress a refrigerant in the gaseous state, whereby the refrigerant may be heated. A high-temperature/high-pressure gaseous refrigerant may be transferred to the outdoor heat exchanger 4 by the compressor 3. In the outdoor heat exchanger 4, the high-temperature/high-pressure gaseous refrigerant may be converted from the gaseous state to the liquid state, and also emit the heat. The liquid refrigerant may be transferred to the expansion valve 5. The expansion valve 5 may depressurize the liquid refrigerant, whereby the refrigerant may be cooled. A low-temperature/low-pressure liquid refrigerant may be transferred to the indoor heat exchanger 20. In the indoor heat exchanger 20, the low-temperature/low-pressure liquid refrigerant may be converted from the liquid state to the gaseous state, and also absorb the heat.

As such, the refrigerant may emit the heat from the outdoor heat exchanger 4 and absorb the heat from the indoor heat exchanger 20. The indoor heat exchanger 20 may be installed in the indoor unit 1 together with the expansion valve 5, and the outdoor heat exchanger 4 may be installed in the outdoor unit 2 together with the compressor 3. Therefore, the indoor heat exchanger 20 may cool an air in the air conditioning space (indoor).

Hereinafter, for convenience of explanation, the indoor unit 1 may be referred to as the air conditioner, and the indoor heat exchanger 20 may be referred to as a heat exchanger.

Figure 2:
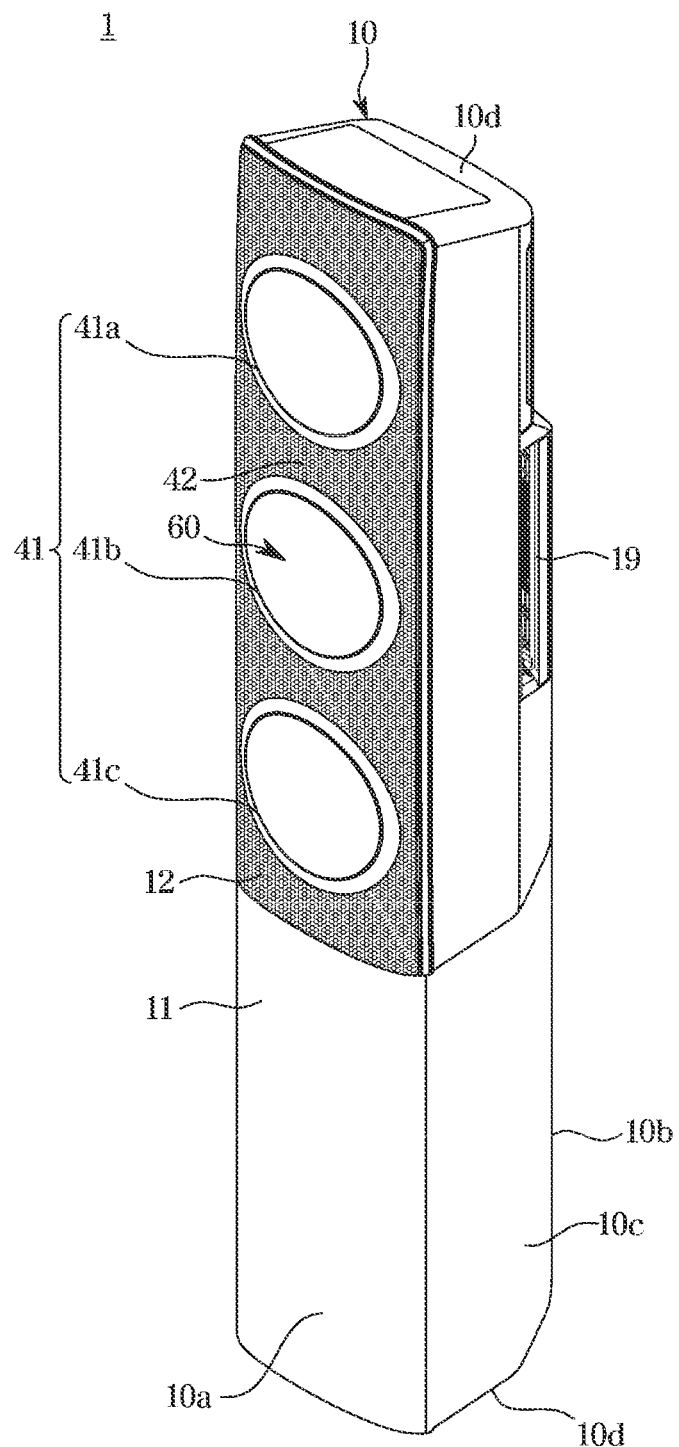
FIG. 2 is a view illustrating an appearance of an air conditioner according to an embodiment.
Figure 3:
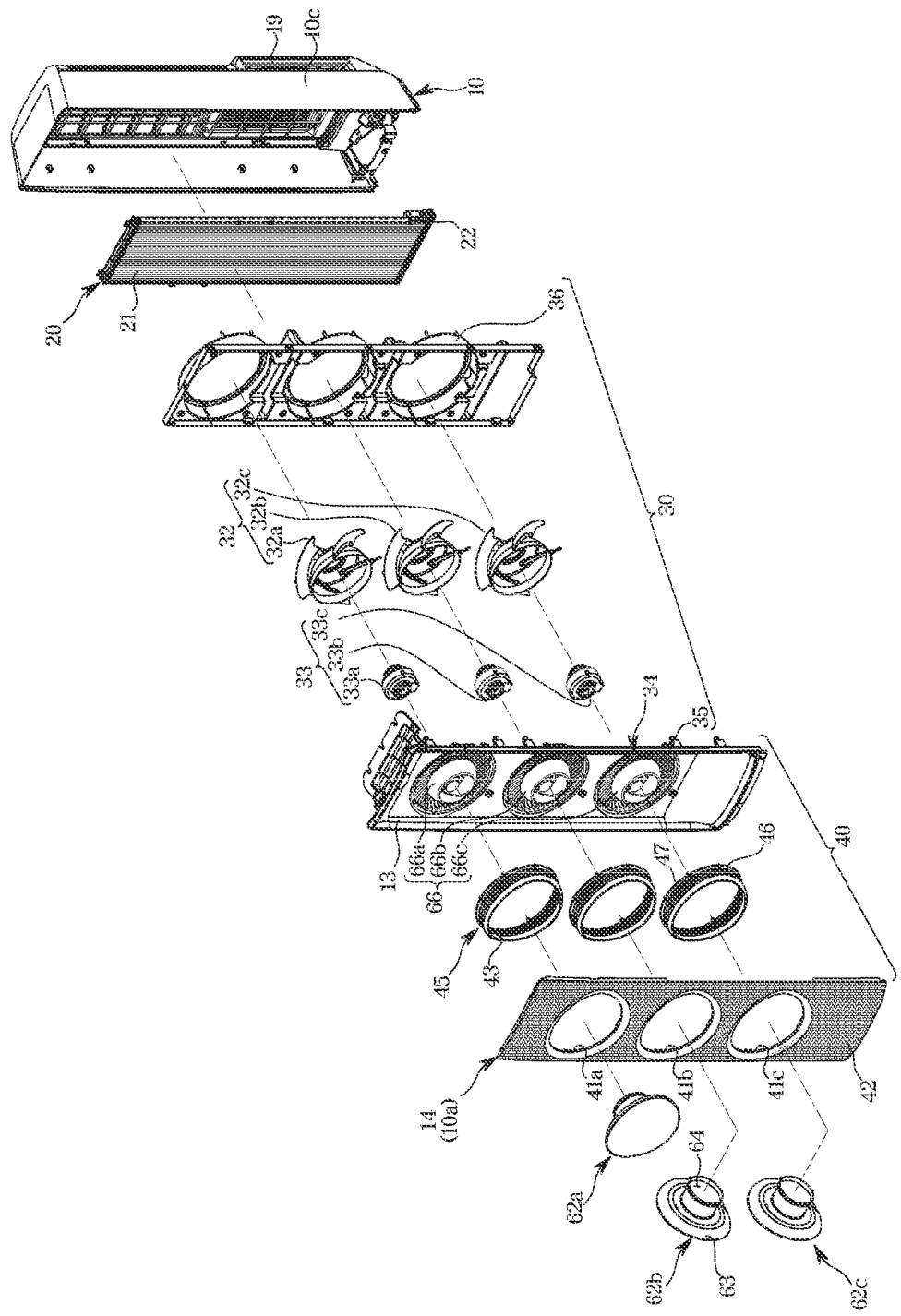
FIG. 3 is an exploded view of an air conditioner according to an embodiment.
Figure 4:
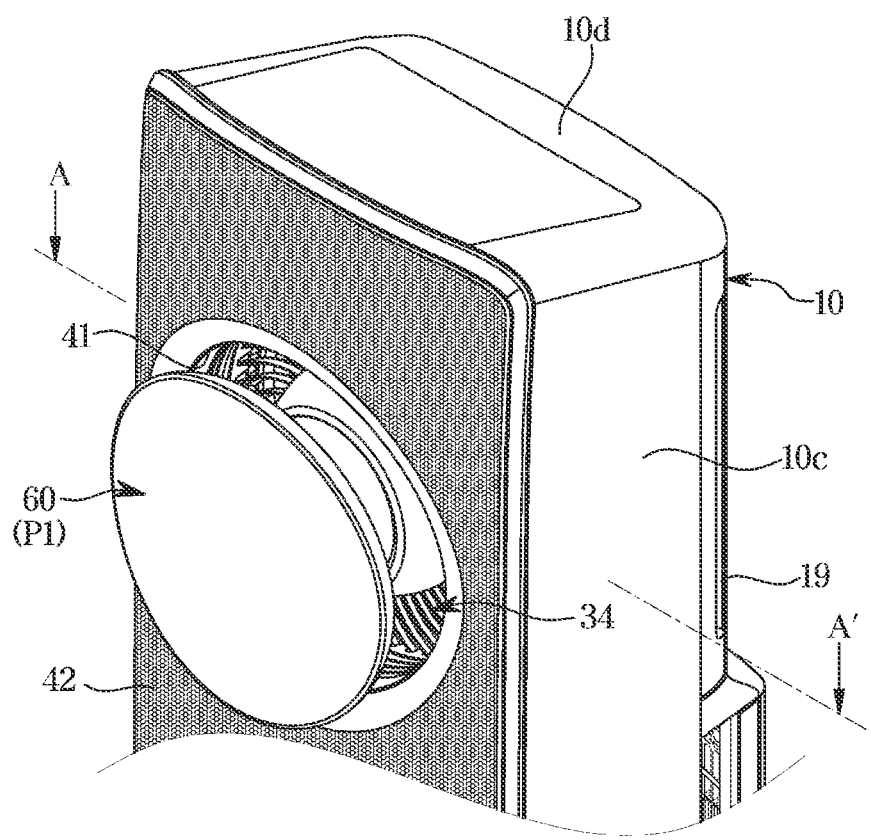
FIG. 4 is a view illustrating that a discharge port of an air conditioner is opened, according to an embodiment.
Figure 5:
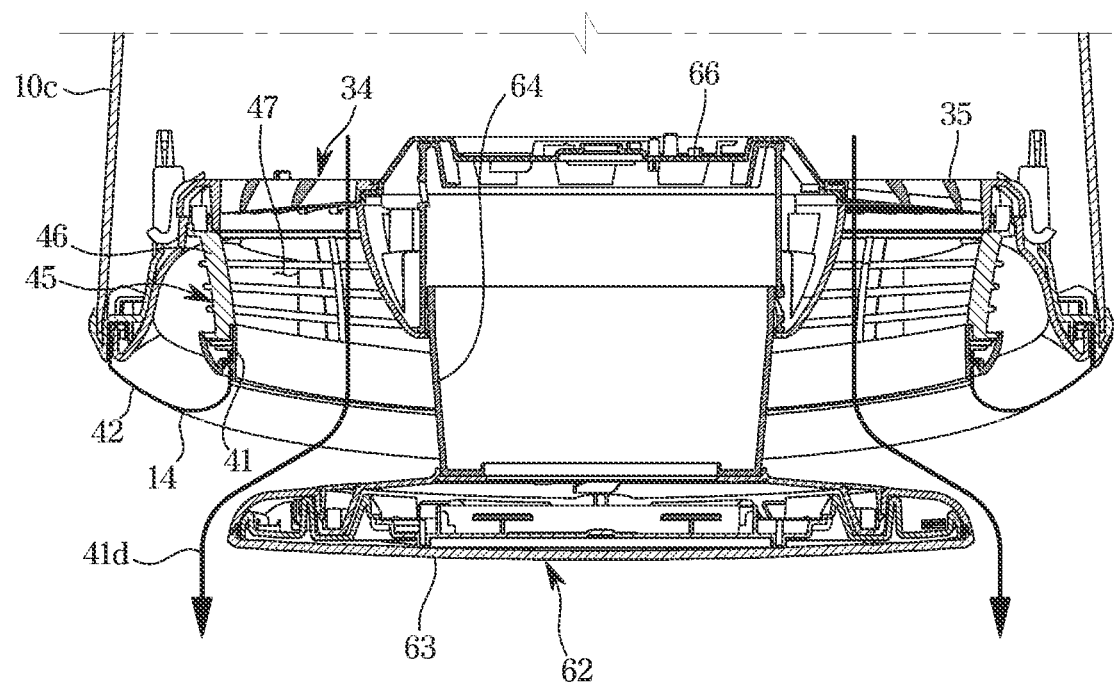
FIG. 5 is a cross-sectional view cut along a line A-A' of FIG. 4.
Figure 6:
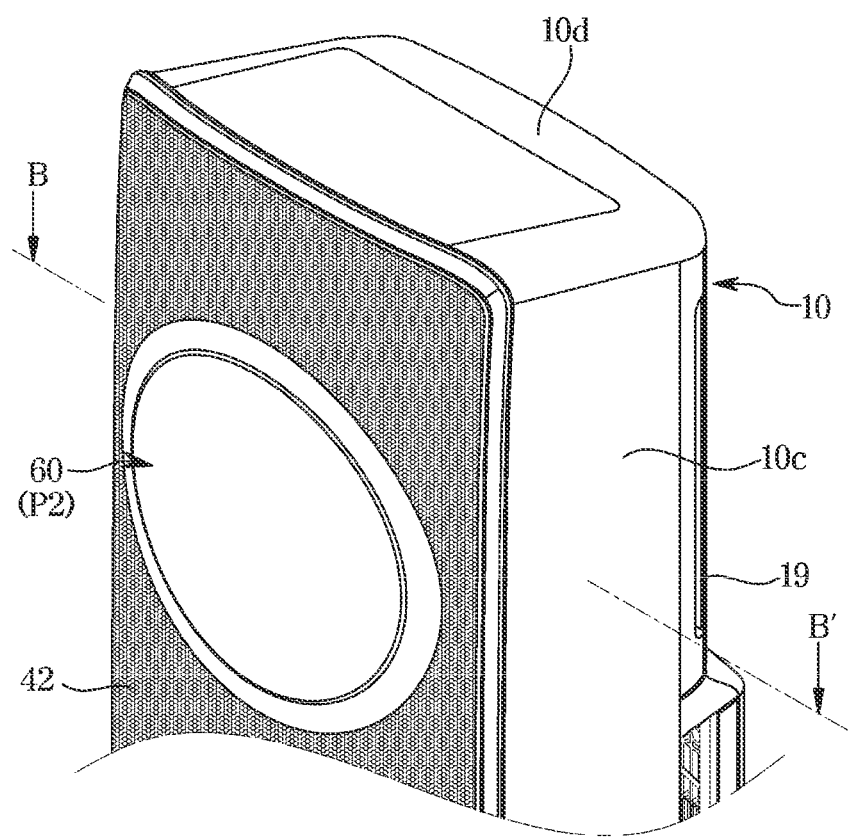
FIG. 6 is a view illustrating that a discharge port of an air conditioner is closed, according to an embodiment.
Figure 7:
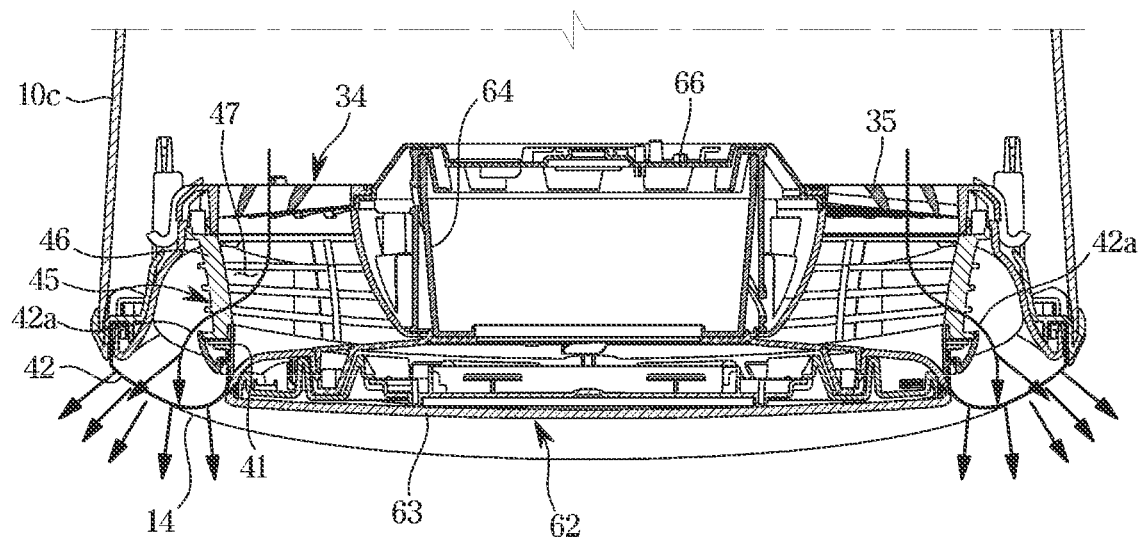
FIG. 7 is a cross-sectional view cut along a line B-B' of FIG. 6.

FIG. 2 is a view illustrating an appearance of an air conditioner according to an embodiment. FIG. 3 is an exploded view of an air conditioner according to an embodiment. FIG. 4 is a view illustrating that a discharge port of an air conditioner is opened, according to an embodiment. FIG. 5 is a cross-sectional view cut along a line A-A' of FIG. 4. FIG. 6 is a view illustrating that a discharge port of an air conditioner is closed, according to an embodiment. FIG. 7 is a cross-sectional view cut along a line B-B' of FIG. 6.

Referring to FIGS. 2 to 7, An air conditioner 1 may include a housing 10 having at least one discharge port 41, a heat exchanger 20 for exchanging the heat with the air flowing into the housing 10, a blower 30 for circulating air into or out of the housing 10, and a discharger 40 for discharging the air blown from the blower 30 out of the housing 10.

The housing 10 may include a front panel 10a with the at least one discharge port 41 formed thereon, a back panel 10b arranged in the back of the front panel 10a, side panels 10c arranged between the front and back panels 10a and 10b, and top/bottom panels 10d arranged on the top/bottom of the side panels 10c. The at least one discharge port 41 may have a circular shape, and at least two or more discharge ports 41 may be arranged on the front panel 10a at predetermined intervals in a vertical direction. For example, the discharge port 41 may include a first discharge port 41a, a second discharge port 41b, and a third discharge port 41c.

The back panel 10b may have a suction port 19 formed to suck an outside air into the housing 10.

The suction port 19 formed on the back panel 10b arranged in the back of the heat exchanger 20 may guide the air outside the housing 10 to flow into the housing 10. The air flowing into the housing 10 through the suction port 19 absorbs or loses heat while passing the heat exchanger 20. The air that has exchanged heat while passing the heat exchanger 20 is discharged by the blower 30 out of the housing 10 through an outlet.

The blower 30 may include a fan 32 and a grill 34.

The grill 34 may be arranged in the direction in which the fan 32 discharges air. In the embodiment, the fan 32 may be a mixed flow fan without being limited thereto, and may be any kind of fan that moves the outside air into the housing 10 and discharges the air out of the housing 10. For example, the fan 32 may be a cross fan, a turbo fan, or a sirocco fan. There is no limitation on the number of the fans 32, and in the embodiment of the present disclosure, there may be at least one fan 32 corresponding to the at least one discharge port 41. For example, the fan 32 may include a first fan 32a, a second fan 32b, and a third fan 32c.

The blower 30 may have a fan motor 33 arranged in the center of the fan 32 for driving the fan 32. For example, the fan motor 33 may include a first fan motor 33a for driving the first fan 32a, a second fan motor 33b for driving the second fan 32b, and a third fan motor 33c for driving a third fan 32c.

The grill 34 may be arranged in front of the fan 32 for guiding airflow. Furthermore, the grill 34 may be arranged between the fan 32 and the air discharge port 41 for minimizing the influence of the outside condition on the fan 32.

The grill 34 may include a plurality of wings 35. The plurality of wings 35 may control the direction or the volume of the air blown from the fan 32 to the discharge port 41 by controlling the number, shape, and/or angle of disposition of the wings 35.

A s will be described later, a door actuator 66, may be arranged in the center of the grill 34. The door actuator 66 and the fan motor 33 may be aligned in the back and forth direction. With the arrangement, the plurality of wings 35 of the grill 34 may be arranged in front of the fan wings of the fan 32.

The blower 30 may include a duct 36. The duct 36 may be formed to have a circular shape that encloses the fan 32 to guide airflow of the air flowing into the fan 32.

The heat exchanger 20 is arranged between the blower fan 32 and the suction port 19 for absorbing heat from or transferring heat to the air flowing in through the suction port 19. The heat exchanger 20 may include a tube 21, and headers 22 combined on the upper and bottom sides of the tube 21. However, the type of the heat exchanger 20 is not limited thereto.

There may be at least one heat exchanger 20 arranged inside the housing 10 to correspond to the number of the discharge ports 41. For example, the discharge ports 41 may include a first discharge port 41a, a second discharge port 41b, and a third discharge port 41c.

The air conditioner may operate with a plurality of operation modes. The plurality of operation modes may include a first cooling mode for discharging the heat-exchanged air through the at least one discharge port 41, and a second cooling mode for discharging the heat-exchanged air through a discharging hole 42 provided in a porous discharging plate 14. A size of the discharge port 41 may be larger than the size of the discharging hole 42. In addition, the number of discharging holes 42 is larger than the number of discharge ports 41, and the discharging holes 42 may be approximately uniformly distributed throughout the discharging plate 14.

Particularly, the heat-exchanged air in the first cooling mode may be discharged to the outside of the air conditioner 1 through the opened first discharge port 41a, second discharge port 41b, or third discharge port 41c. At this time, the air conditioner 1 may perform the first cooling mode by selectively opening the first discharge port 41a, the second discharge port 41b or the third discharge port 41c according to the detected indoor temperature.

In the second cooling mode, the first discharge port 41a, the second discharge port 41b, and the third discharge port 41c may be all closed, and the heat-exchanged air may be discharged through the discharging hole 42 provided in the discharging plate 14.

That is, the heat-exchanged air by the heat exchanger 20 may be discharged to the outside of the air conditioner 1 through at least one discharge port 41 and the discharging hole 42 by the fan 32.

In the first cooling mode, the heat-exchanged air is discharged through the discharge port 41, but not only through the discharge port 41, but a part thereof may be discharged through the discharging hole 42. That is, in the first cooling mode, most of the heat-exchanged air may be discharged through the discharge port 41. In the second cooling mode, as in the first cooling mode, most of the heat-exchanged air may be discharged through the discharging hole 42.

The air passing through the blower 30 may be discharged to the outside of the housing 10 through the discharge port 41.

When the air conditioner 1 is in the first cooling mode, the heat-exchanged air may be discharged to the outside of the housing 10 through the discharge port 41. The discharge port 41 may be provided so that heat-exchanged air can be directly discharged to the outside. The discharge port 41 may be provided to be exposed to the outside of the housing 10. The discharge port 41 may be provided on a blowing direction of the fan 32 so that heat-exchanged air can be directly discharged to the outside. The air blown from the fan 32 may flow through a first discharging fluid path 41d formed between the fan 32 and the discharge port 41. The first discharging fluid path 41d may be formed by a discharging guide 45.

The first discharging fluid path 41d may be formed by the discharging guide 45. An end 43 of the discharging guide 45 may be connected to the discharge port 41 and form the first discharging fluid path 41d along an inner circumference of the discharging guide 45. The end 43 of the discharging guide 45 may be exposed to the outside through the discharge port 41 of the housing 10, and formed to enable a door 60, which will be described below, to be safely placed in the discharging guide 45.

The discharge port 41 may be opened and closed by the door 60.

The door 60 may open and close the discharge port 41, and may be formed to discharge the heat-exchanged air out of the housing 10 selectively through the discharge port 41. For example, the door 60 may include a first door 60a for opening and closing the first discharge port 41a, a second door 60b for opening and closing the second discharge port 41b, and a third door 60c for opening and closing the third discharge port 41c.

The door 60 may move between an open position P1 for opening the discharge port 41 and a closed position P2 for closing the discharge port 41. The door 60 may move the open position P1 and the closed position P2 back and forth.

In detail, the door 60 may include a door blade 62 and the door actuator 66 for operating the door blade 62, respectively.

The door blade 62 may be shaped like a circle corresponding to the shape of the discharge port 41. When the door 60 is in the open position 60a, the door blade 62 is arranged to be at some distance from the end 43 of the discharging guide 45, and when the door 60 is in the closed position 60b, the door blade 62 is arranged to contact the end 43 of the discharging guide 45 to close the discharge port 41. For example, the door blade 62 may include a first door blade 62a for opening and closing the first discharge port 41a, a second door blade 62b for opening and closing the second discharge port 41b, and a third door blade 62c for opening and closing the third discharge port 41c.

The door blade 62 may include a blade body 63 having a circular form to correspond to the discharge port 41, and a blade combiner 64 formed to extend from the blade body 63 to be combined with the door actuator 66.

The blade body 63 may be shaped like almost a round plate. Furthermore, the blade body 63 may be formed such that one side of the blade body 63 faces the outside of the housing 10 and the other side of the blade body 63 faces the discharge port 41.

A display may be arranged on one side of the blade body 63 for displaying operation states of the air conditioner 1 or allowing the user to manipulate the air conditioner 1.

The door actuator 66 may move the door blade 62. The door actuator 66 may include a motor. The door actuator 66 may be combined with the blade combiner 64 of the door blade 62 to move the door blade 62.

For example, the door actuator 66 may include a first door actuator 66a for moving the first door blade 62a, a second door actuator 66b for moving the second door blade 62b, and a third door actuator 66c for moving the third door blade 62c.

The aforementioned grill 34 may be arranged along the circumference of the door actuator 66. The air blown from the fan 32 arranged on the back of the grill 34 may pass the grill 34 and be discharged ahead.

While the air conditioner is operating in the second cooling mode, the heat-exchanged air may be discharged out of the housing 10 through the discharging hole 42. This arrangement enables the heat-exchanged air to be discharged to the outside while a wind speed of the heat-exchanged air is reduced. The discharging hole 42 may include a plurality of discharging holes 42 formed in the porous discharging plate 14 to be described later.

When the heat-exchanged air is discharged to the outside of the housing 10 through the discharging hole 42, the air blown from the fan 32 may flow through a second discharging fluid path 42a formed between the fan 32 and the discharging hole 42. The second discharging fluid path 42a may be formed by a discharging guide 45 and a discharging panel 12, which will be described below.

The discharging panel 12 may form the second discharging fluid path 42a. The heat-exchanged air may be discharged out of the air conditioner 1 at a low speed through the second discharging fluid path 42a formed by the discharging panel 12 and the discharging plate 14 to be described later.

The discharging panel 12 may include a fluid path shaping frame 13 and the discharging plate 14.

The fluid path shaping frame 13 may be formed to partition the inside of the housing 10 from the second discharging fluid path 42a. The fluid path shaping frame 13 may prevent the heat-exchanged air from flowing back into the housing 10. In the embodiment of the present disclosure, the fluid path shaping frame 13 may be formed to extend from the grill 34 to be connected to an exterior panel 11.

The discharging hole 42 may be formed on the discharging plate 14. The shape of the discharging hole 42 has no limitation, but in the embodiment of the present disclosure, may have the form of the plurality of discharging holes 42. The discharging hole 42 may be formed to bore through the front and back faces of the discharging plate 14.

The discharging hole 42 may include a discharging area. In the discharging area, a plurality of discharging holes may be formed such that they are uniformly distributed or concentrated in at least a portion of the discharging area. In the embodiment of the present disclosure, the discharging area has the plurality of uniformly distributed holes 42.

The discharging area may be formed at least a portion of the discharging plate 14. It is, however, not limited thereto, but may be formed all over the discharging plate 14.

The discharger 40 may include the first discharging fluid path 41d and the second discharging fluid path 42a.

The air blown by the fan 32 may flow through at least one of the first and second discharging fluid paths 41d and 42a.

In the first cooling mode, the air blown by the fan 32 may flow through the first discharging fluid path 41d formed between the fan 32 and the discharge port 41. In the second cooling mode, the air blown by the fan 32 may flow through the second discharging fluid path 42a formed between the fan 32 and the discharging hole 42.

The discharger 40 may include the discharging guide 45. The air blown by the fan 32 may be controlled by the discharging guide 45. The discharging guide 45 may be arranged in front of the blower 30 for enabling the air flowing from the blower 30 to flow through at least one of the first and second discharging fluid paths 41*d* and 42*a*.

The discharging guide 45 may include a guide body 46 and a guide groove 47.

The guide body 46 may be formed to form the first discharging fluid path 41*d* on the inside. The guide body 46 may be shaped like a cylinder with a cavity. Particularly, the guide body 46 may have the form of a pipe with one side facing the blower 30 and the other side facing the discharge port 41.

The guide groove 47 may be formed for the second discharging fluid path 42*a* to pass through. The guide groove 47 may be formed on the guide body 46. There is no limitation on the shape of the guide groove 47, and the guide groove 47 may have any shape if only it is formed on the guide body 46 for enabling the air to flow to the outer direction of the guide body 46. In the embodiment of the present disclosure, the guide groove 47 may be formed to have a plurality of halls along the circumference of the guide body 46.

In the first cooling mode, the door 60 may open the discharge port 41. In this case, the air blown from the blower 30 passes the first discharging fluid path 41*d* formed inside of the guide body 46 and is discharged to the discharge port 41.

In the second cooling mode, the door 60 may close the discharge port 41. In this case, one side of the guide body 46 is closed by the door 60, forcing the air blown from the blower 30 to pass the guide groove 47 formed on the guide body 46 and is discharged to the discharging hole 42.

The following describes the operation of the air conditioner 1 of the present disclosure.

The air introduced into the housing 10 from the outside may exchange heat with the heat exchanger 20. The air heated or cooled by the heat exchanger 20 may be discharged to the outside of the housing 10 by the blower 30.

The air conditioner 1 may discharge the air that has passed through the heat exchanger 20 to the outside through at least one of the discharge port 41 and the discharging hole 42. That is, as in the first cooling mode, the heating or cooling may be performed quickly by discharging through the discharge port 41, and as in the second cooling mode, the heating or cooling may be gradually performed throughout the indoor by discharging through the discharging hole 42.

The discharge port 41 may be opened and closed by operating the door 60. When the discharge port 41 is open, the heat-exchanged air may be discharged through the discharge port 41. When the discharge port 41 is closed, the heat-exchanged air may be discharged through the discharging hole 42.

The first cooling mode will be described. In the first cooling mode, the heat-exchanged air may be discharged through the discharge port 41. In the first cooling mode, the door blade 62 may be located in the open position P1, and the door blade 62 may be spaced apart from the end 43 of the discharging guide 45 so that the discharge port 41 is opened.

In this case, the air flowing from the blower 30 may flow to the discharge port 41 through the first discharging fluid path 41*d* formed by the guide body 46 of the discharging guide 45.

When discharged to the outside of the housing 10 through the discharge port 41, it is discharged to the outside while maintaining the wind speed by the blower 30.

The second cooling mode will be described. In the second cooling mode, the heat-exchanged air may be discharged through the discharging hole 42. In the second cooling mode, the door blade 62 may be located in the closed position P2, and the door blade 62 comes into contact with the end 43 of the discharging guide 45, so that the discharge port 41 may be closed.

In this case, since the discharge port 41 is blocked by the door blade 62, the air flowing from the blower 30 may pass through the guide groove 47 formed in the guide body 46 of the discharging guide 45. Through this, the air flowing from the blower 30 may pass through the second discharging fluid path 42*a* and flow into the discharging hole 42.

When discharged to the outside of the housing 10 through the discharging hole 42, the air passes through the plurality of discharging holes of the discharging plate 14 and the wind speed is reduced, and is discharged to the outside at the low speed.

Through this configuration, the user may cool or heat the indoor at the wind speed that feels comfortable.

Figure 8:
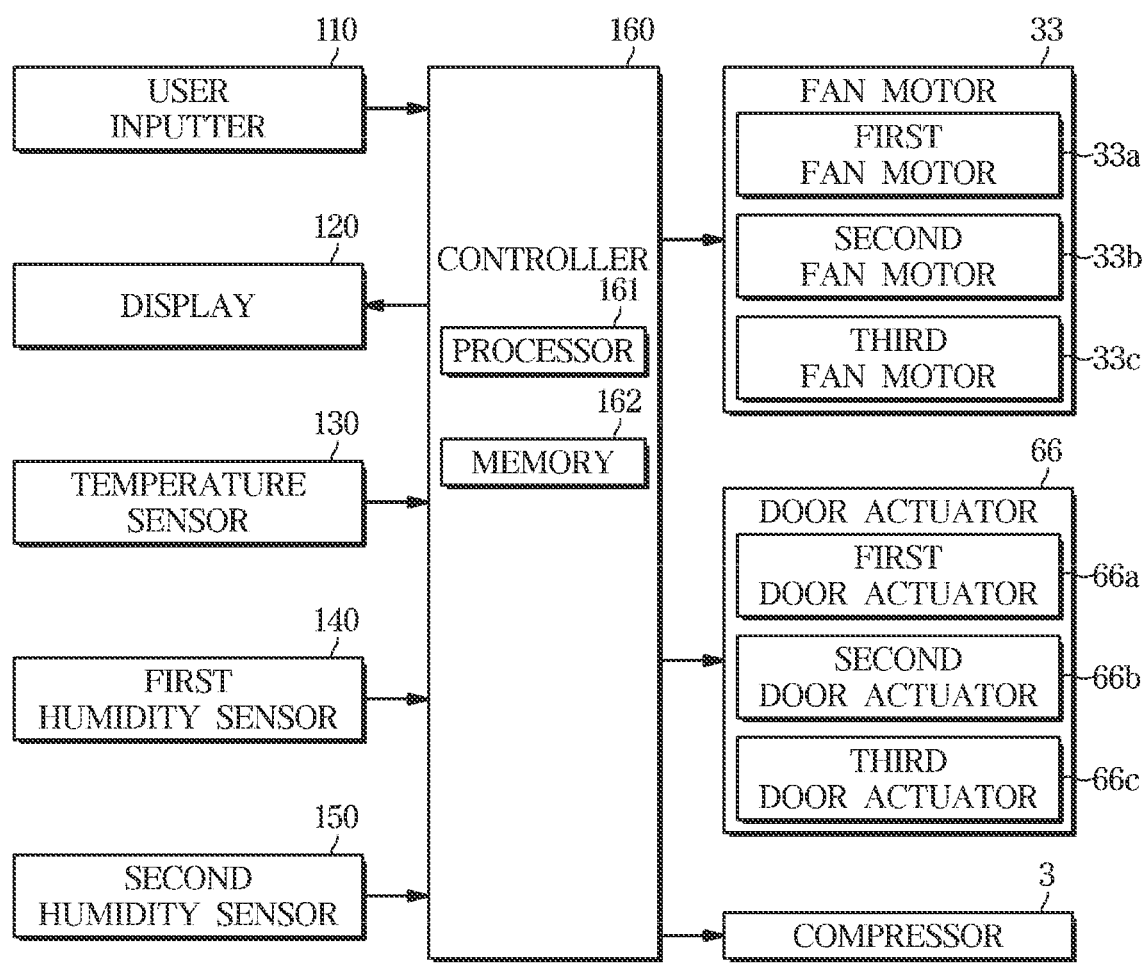
FIG. 8 is a view illustrating a configuration of an air conditioner according to an embodiment.
Figure 9:
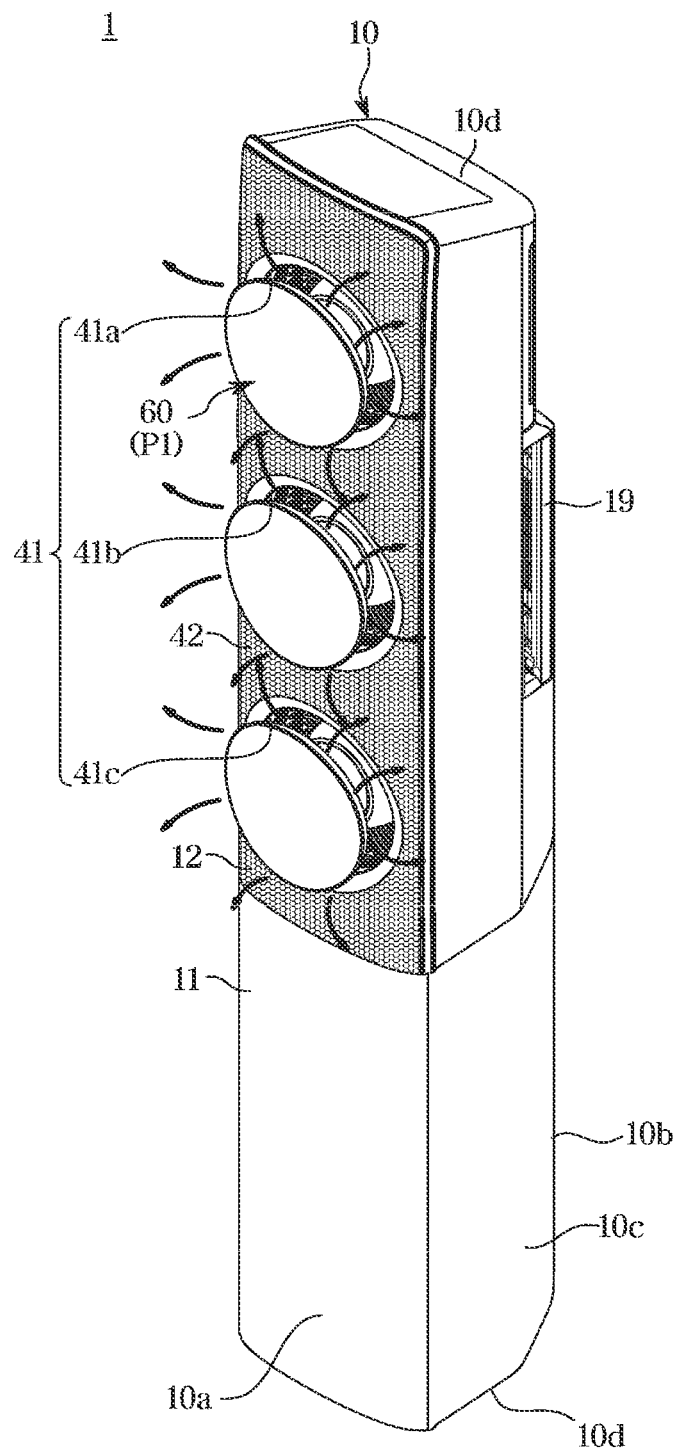
FIG. 9 is a view illustrating a first drying operation of an air conditioner according to an embodiment.
Figure 10:
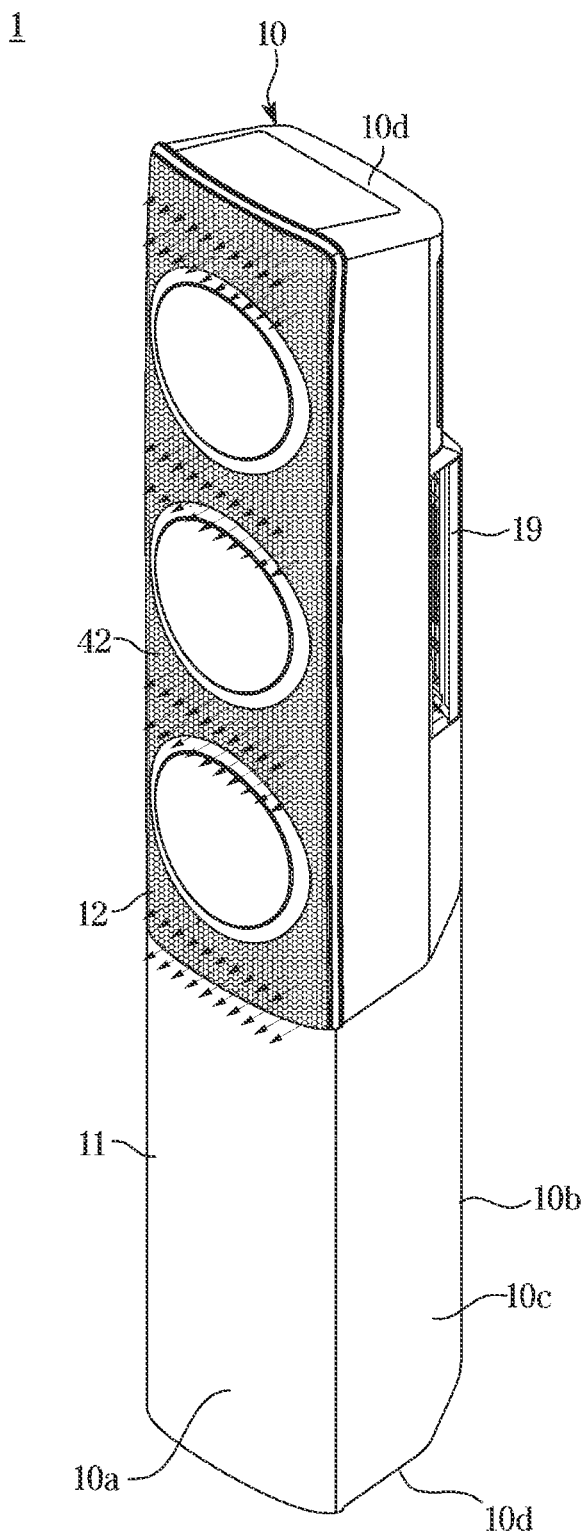
FIG. 10 is a view illustrating a second drying operation of an air conditioner according to an embodiment.

FIG. 8 is a view illustrating a configuration of an air conditioner according to an embodiment. FIG. 9 is a view illustrating a first drying operation of an air conditioner according to an embodiment. FIG. 10 is a view illustrating a second drying operation of an air conditioner according to an embodiment.

Referring to FIGS. 8 to 10, the air conditioner 1 may include a user inputter 110, a display 120, a temperature sensor 130, a first humidity sensor 140, a second humidity sensor 150, the fan motor 33, the door actuator 66, the compressor 3, and a controller 160.

The user inputter 110 may receive a user input related to the operation of the air conditioner 1 from the user and output an electrical signal (voltage or current) corresponding to the received user input to the controller 160.

The user inputter 110 may include a plurality of buttons provided on the housing 10. For example, the user inputter 110 may include a button for setting a target temperature of the indoor (air conditioning space), a button for selecting one of the first cooling mode and the second cooling mode, a button for setting a wind strength (rotation speed of the fan) by the fan 32, and the like. The plurality of buttons may be provided on the side panels 10*c* or the door 60. The plurality of buttons may include a push switch and a membrane switch operated by pressing the user, or a touch switch operated by contact of a user's body part.

The user inputter 110 may include a remote controller provided separately from the air conditioner 1 and a receiver for receiving a radio signal from the remote controller. Like the housing 10, the remote controller may include a plurality of buttons.

The display 120 may receive information about the operation of the air conditioner 1 and information about an indoor environment from the controller 160, and display an image representing the received information. For example, the display 120 may display the target temperature of the indoor (air conditioning space), a measured temperature of the indoor, a cooling mode, and the wind strength. The display 120 may be provided on the door 60 and may include a liquid crystal display (LCD) panel, a light emitting diode (LED) panel, and the like.

The temperature sensor 130 may detect a temperature of the indoor (outside of the air conditioner) and transmit an electrical signal (voltage or current) indicating the detected temperature to the controller 160. For example, the temperature sensor 130 may include a thermistor whose electrical resistance value changes according to the temperature.

The temperature sensor 130 may detect a temperature of indoor air that has not passed the heat exchanger 20. The temperature sensor 130 may be located upstream of the heat exchanger 20 in a flow of air by the blower 30. For example, the temperature sensor 130 may be located near the suction port 19.

The first humidity sensor 140 may detect a humidity in the indoor (outside of the air conditioner) and transmit an electrical signal (voltage or current) indicating the detected humidity to the controller 160. For example, the first humidity sensor 140 may include a material whose electrical resistance value or capacitance changes according to the humidity.

The first humidity sensor 140 may detect the humidity of indoor air that has not passed through the heat exchanger 20. The first humidity sensor 140 may be located upstream of the heat exchanger 20 in the flow of air by the blower 30. For example, the first humidity sensor 140 may be located near the suction port 19.

The second humidity sensor 150 may detect the humidity inside the air conditioner 1 (inside the housing) and transmit an electrical signal (voltage or current) indicating the detected humidity to the controller 160.

The second humidity sensor 150 may detect the humidity of the air passing through the heat exchanger 20. The second humidity sensor 150 may be located downstream of the heat exchanger 20 in the flow of air by the blower 30. The second humidity sensor 150 may be located between the heat exchanger 20 and the fan 32, or may be located between the fan 32 and the discharging plate 14. For example, the second humidity sensor 150 may be installed on the duct 36 or on the grill 34.

The second humidity sensor 150 may be installed at a position approximately corresponding to the center in the vertical direction of the heat exchanger 20 in order to detect a correct humidity of the air passing through the heat exchanger 20. For example, the second humidity sensor 150 may be located within a range of ±20% from the center of the heat exchanger 20 (±20% of a vertical length of the heat exchanger and ±20% of a horizontal length of the heat exchanger). The humidity at the top of the heat exchanger 20 may be relatively low because a condensed water falls by a gravity, and the humidity at the bottom of the heat exchanger 20 is affected by a header 22 of the heat exchanger 20 and a drain container. By installing the second humidity sensor 150 at approximately the center of the heat exchanger 20, it is possible to accurately detect the humidity.

However, the installation position of the second humidity sensor 150 is not limited to approximately the center of the heat exchanger 20. For example, the second humidity sensor 150 may be installed under the heat exchanger 20. By installing the second humidity sensor 150 under the heat exchanger 20, the second humidity sensor 150 may measure a higher humidity than an actual internal humidity, and thereby the inside of the housing 10 may be sufficiently dried.

The fan motor 33 may rotate the fan 32 in response to a blowing control signal of the controller 160. The fan motor 33 may adjust the rotation speed of the fan 32 in response to the blowing control signal of the controller 160. For example, the fan motor 33 may rotate the fan 32 at a maximum of 1,100 rpm (revolutions per minute) to 1,200 rpm, and may rotate at a minimum of 700 rpm to 800 rpm.

The fan 32 rotated by the fan motor 33 may generate the flow of air passing through the heat exchanger 20. Particularly, the fan 32 may suck the outside air (indoor air) through the suction port 19, and the suctioned air may exchange heat with the heat exchanger 20 while passing through the heat exchanger 20. In addition, the heat-exchanged air may be discharged through the discharge port 41 or discharged through the discharging hole 42 depending on the cooling mode of the air conditioner 1.

The fan motor 33 may include the first fan motor 33a for rotating the first fan 32a, the second fan motor 33b for rotating the second fan 32b, and the third fan motor 33c for rotating the third fan 32c.

The door actuator 66 may move the door blade 62 in response to a mode control signal from the controller 160. For example, the door actuator 66 may move the door blade 62 to the open position P1 or may move the door blade 62 to the closed position P2.

When the door blade 62 is located in the open position P1 by the door actuator 66, the first discharging fluid path 41d may be opened, and the flow of air discharged to the discharge port 41 may be generated through the first discharging fluid path 41d. When the door blade 62 is located in the closed position P2 by the door actuator 66, the first discharging fluid path 41d may be closed, and the flow of air discharged to the discharge hole 42 may be generated through the second discharging fluid path 42a.

The door actuator 66 may include the first door actuator 66a for moving the first door blade 62a, the second door actuator 66b for moving the second door blade 62b, and the third door actuator 66c for moving the third door blade 62c.

In response to a cooling control signal of the controller 160, the compressor 3 may circulate a refrigerant circulation circuitry including the compressor 3, the outdoor heat exchanger 4, the expansion valve 5, and the indoor heat exchanger 20. Particularly, the compressor 3 may compress the gaseous refrigerant and discharge the high-temperature high-pressure gaseous refrigerant. The refrigerant discharged from the compressor 3 may circulate through the outdoor heat exchanger 4, the expansion valve 5, and the indoor heat exchanger 20, and may discharge the heat from the outdoor heat exchanger 4 and absorb the heat from the indoor heat exchanger 20.

As described above, the compressor 3 may be installed in the outdoor unit 2, the compressor 3 may be located physically far from the controller 160 of the indoor unit 1. Accordingly, the compressor 3 may communicate with the controller 160.

The controller 160 may include a control circuitry, and may be electrically connected to the user inputter 110, the display 120, the temperature sensor 130, the first humidity sensor 140, the second humidity sensor 150, the fan motor 33, the door actuator 66, and the compressor 3. The controller 160 may control the fan motor 33, the door actuator 66, and the compressor 3 based on the outputs of the user inputter 110, the display 120, the temperature sensor 130, the first humidity sensor 140, and the second humidity sensor 150.

The controller 160 may include a processor 161 for generating a control signal for controlling the operation of the air conditioner 1, and a memory 162 for memorizing or storing programs and data for generating the control signal.

The processor 161 may include the user input received by the user inputter 110, an external temperature (indoor temperature) detected by the temperature sensor 130, an external humidity (indoor humidity) detected by the first humidity sensor 140, and an internal humidity (internal humidity of the housing) detected by the second humidity sensor 150.

The processor 161 may include an operation circuitry, a memory circuitry, and the control circuitry. The processor 161 may include one chip or may include a plurality of chips. In addition, the processor 161 may include one core or may include a plurality of cores.

The memory 162 may memorize and/or store the programs and/or the data for processing the user input, the external temperature (indoor temperature), the external humidity (indoor humidity), and the internal humidity (internal humidity of the housing). In addition, the memory 162 may memorize and/or store programs and/or data for controlling the fan motor 33, the door actuator 66, and the compressor 3.

The memory 162 may include a volatile memory such as Static Random Access Memory (S-RAM) and Dynamic Random Access Memory (D-RAM), and a non-volatile memory such as Read Only Memory (ROM) and Erasable Programmable Read Only Memory (EPROM). The memory 162 may include one memory element or a plurality of memory elements.

As such, the controller 160 including the processor 161 and the memory 162 may control the operation of the air conditioner 1.

For example, the controller 160 may perform the cooling process based on the target temperature and the indoor temperature (external temperature). During the cooling process, the controller 160 may operate the compressor 3 and the fan motor 33. The processor 161 may output the cooling control signal for operating the compressor 3 and the fan motor 33 based on the target temperature set by the user input and the external temperature detected by the temperature sensor 130.

In addition, the controller 160 may control the air conditioner 1 so that the air conditioner 1 operates in one of the first cooling mode and the second cooling mode based on the user input. The processor 161 may output the mode control signal for controlling the door actuator 66 and the fan motor 33 depending on the cooling mode selected by the user input. When the first cooling mode is selected, the processor 161 may output the control signal to the door actuator 66 to open the discharge port 41, and may output the control signal to the fan motor 33 to rotate the fan 32 at a maximum rotation speed. In addition, when the second cooling mode is selected, the processor 161 may output the control signal to the door actuator 66 to close the discharge port 41, and may output the fan motor 33 to rotate the fan 32 at a minimum rotation speed.

The controller 160 may perform the drying process for drying the interior of the housing 10 in response to the user input for terminating the cooling process. During the drying process, the controller 160 may stop the compressor 3 and operate the fan motor 33. In order to dry the interior of the housing 10, the processor 161 may output the control signal for operating the fan motor 33 based on the internal humidity (humidity inside the housing) detected by the second humidity sensor 150.

During the cooling process, the heat exchanger 20 may be cooled by the refrigerant, and when the air suctioned through the suction port 19 contacts the cooled heat exchanger 20, the moisture may be condensed on the surface of the heat exchanger 20. During the cooling process, since the fan 32 blows the air, the moisture condensed on the surface of the heat exchanger 20 may be collected in the drain container provided under the heat exchanger 20 by the blown air.

When the fan 32 is stopped after the cooling process is finished, the moisture condensed in the heat exchanger 20 may not be removed. In addition to the heat exchanger 20, the moisture condensed in the duct 36 and the grill 34 may not be removed. Due to the moisture, microorganisms propagate in the heat exchanger 20, the duct 36, and the grill 34, thereby causing stains and odors.

To prevent this, the air conditioner 1 may perform the drying process in which the fan 32 is rotated even after the cooling process is finished.

During the drying process, the controller 160 may control the rotation speed of the fan motor 33 and control the operation of the door actuator 66 based on the internal humidity of the air conditioner 1.

Particularly, the drying process may include a first drying operation and a second drying operation.

During the first drying operation, the controller 160 may stop the compressor 3, open the discharge port 41 as illustrated in FIG. 9, and control the fan motor 33 to rotate the fan 32 at a first rotation speed. In this case, the first rotation speed may be the maximum rotation speed of the fan motor 33 or a rotation speed close thereto. For example, the first rotation speed may be approximately 1,100 rpm to 1,200 rpm.

During the first drying operation, since the discharge port 41 is opened and the fan 32 has the maximum rotation speed or the rotation speed close thereto, the air suctioned through the suction port 19 may quickly pass through the heat exchanger 20. Accordingly, the moisture condensed in the heat exchanger 20 falls and may be collected in the drain container provided under the heat exchanger 20. In addition, the suctioned air may be rapidly discharged through the discharge port 41 through the first discharging fluid path 41d, and the moisture in the duct 36 and the grill 34 may also be quickly removed.

During the second drying operation, the controller 160 may stop the compressor 3, close the discharge port 41 as illustrated in FIG. 10, and control the fan motor 33 to rotate the fan 32 at a second rotation speed. In this case, the second rotation speed may be the maximum rotation speed of the fan motor 33 or a rotation speed close thereto. For example, the first rotation speed may be approximately 1,100 rpm to 1,200 rpm.

During the first drying operation, since the discharge port 41 is opened and the fan 32 has the maximum rotation speed or the rotation speed close thereto, the air suctioned through the suction port 19 may quickly pass through the heat exchanger 20. Accordingly, the moisture condensed in the heat exchanger 20 falls and may be collected in the drain container provided under the heat exchanger 20. In addition, the suctioned air may be rapidly discharged through the discharge port 41 through the first discharging fluid path 41d, and the moisture in the duct 36 and the grill 34 may also be quickly removed.

Figure 11:
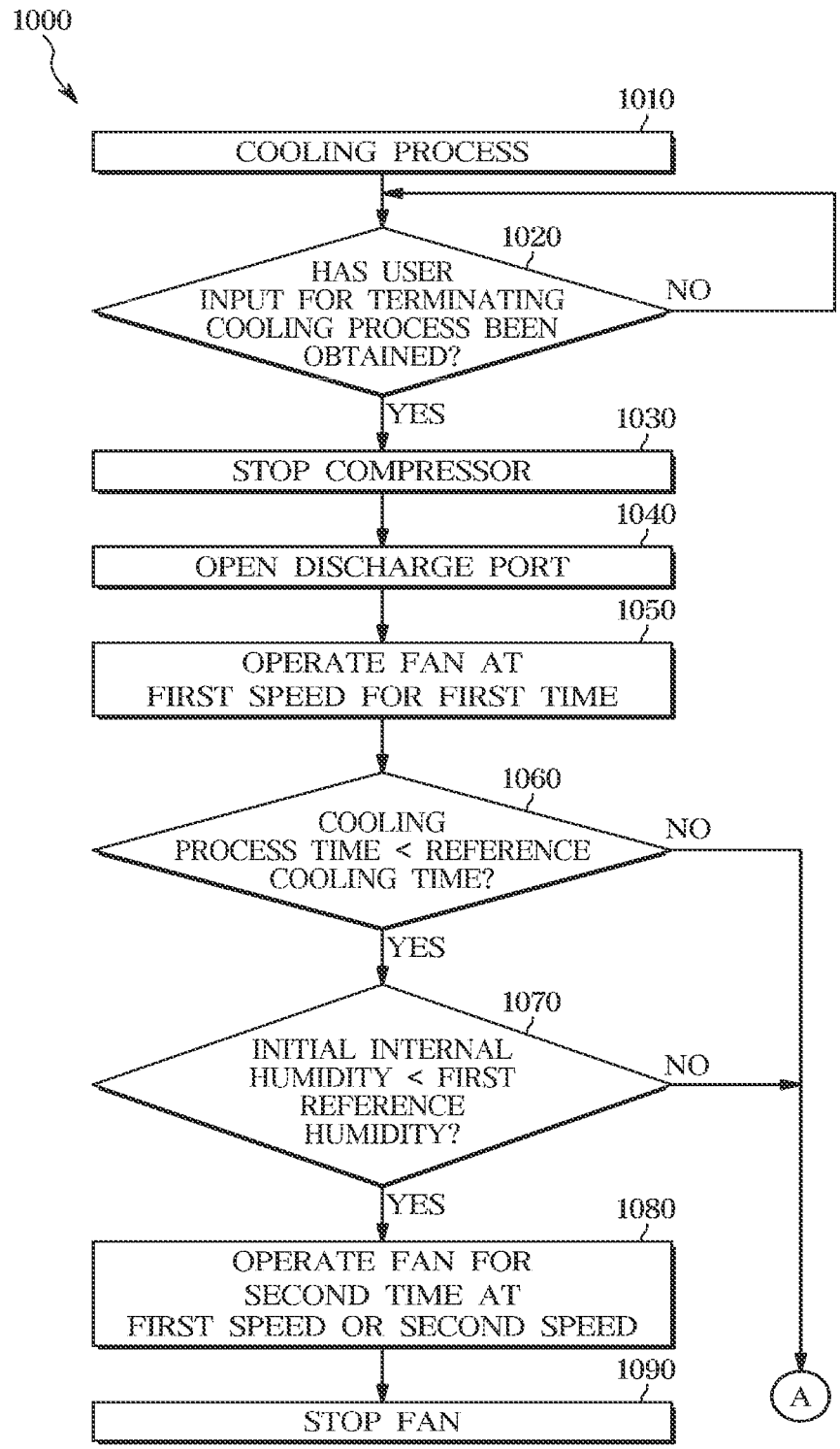
FIGS. 11 and 12 are views illustrating an example of a drying process of an air conditioner according to an embodiment.
Figure 12:
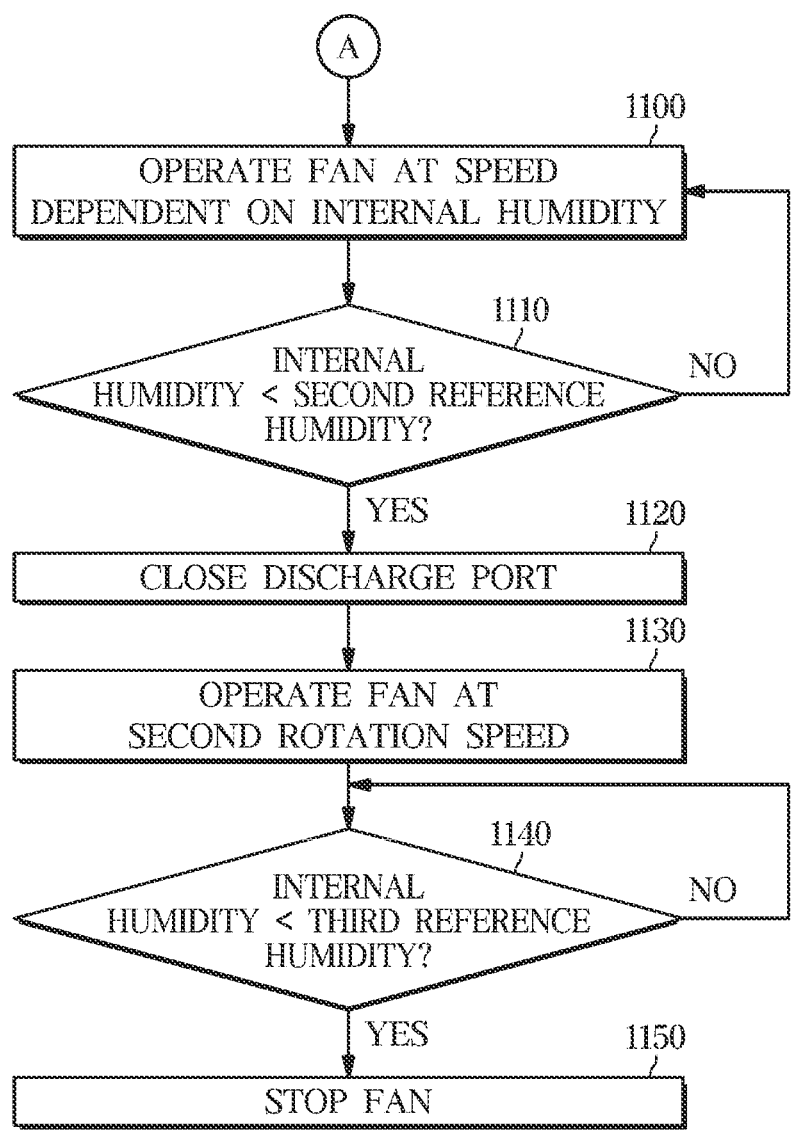
Figure 13:
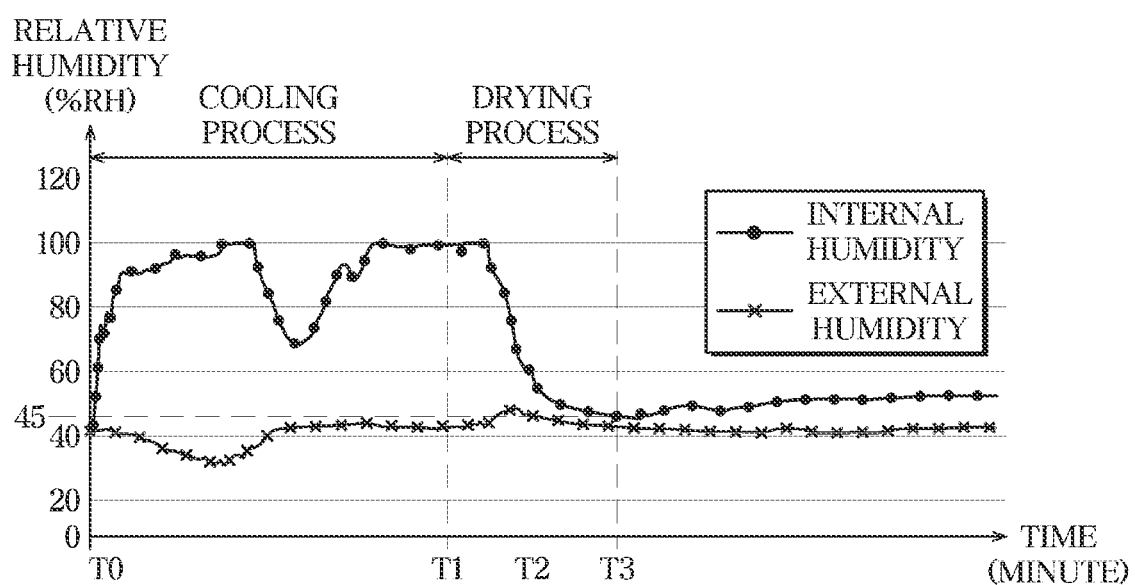
FIG. 13 is a view illustrating an example of an internal humidity of an air conditioner by a drying process illustrated in FIGS. 11 and 12.
Figure 14:
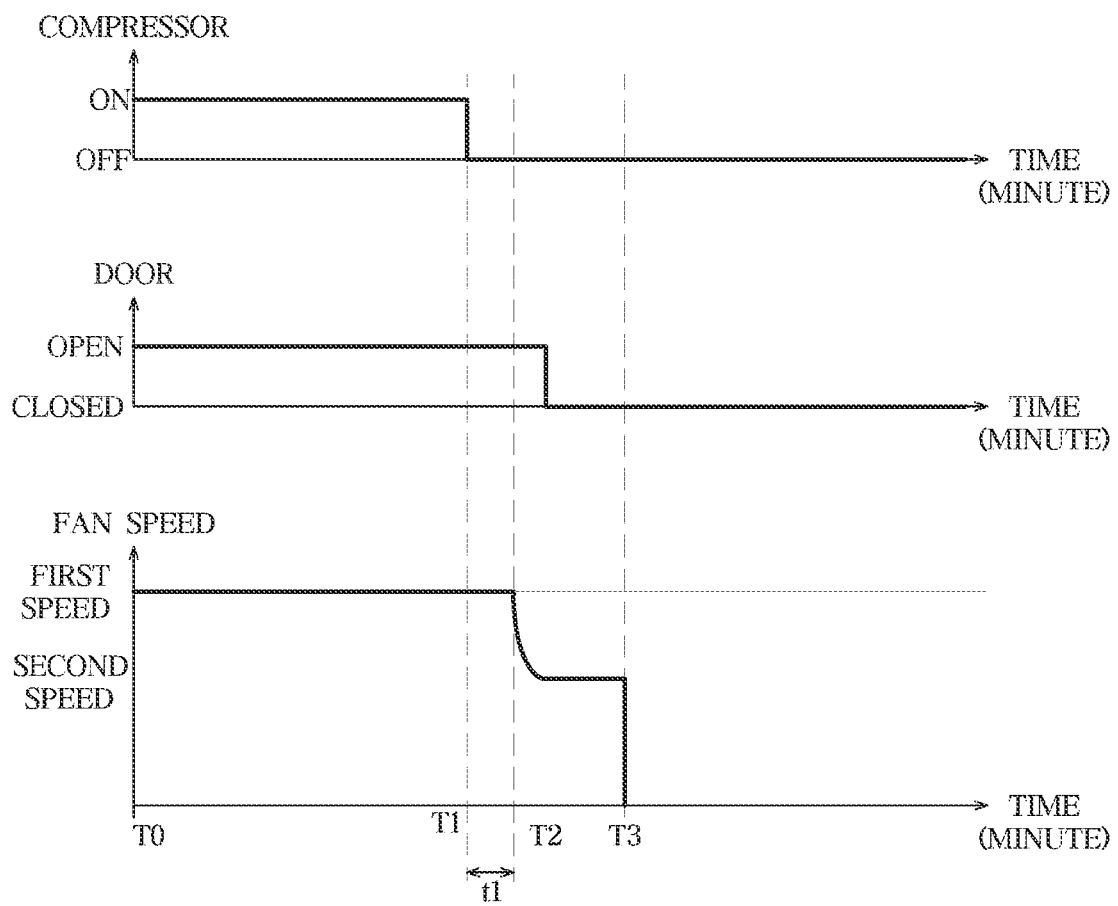
FIG. 14 is a view illustrating an opening and closing of a door and a rotation speed of a fan by a drying process illustrated in FIGS. 11 and 12.
Figure 15:
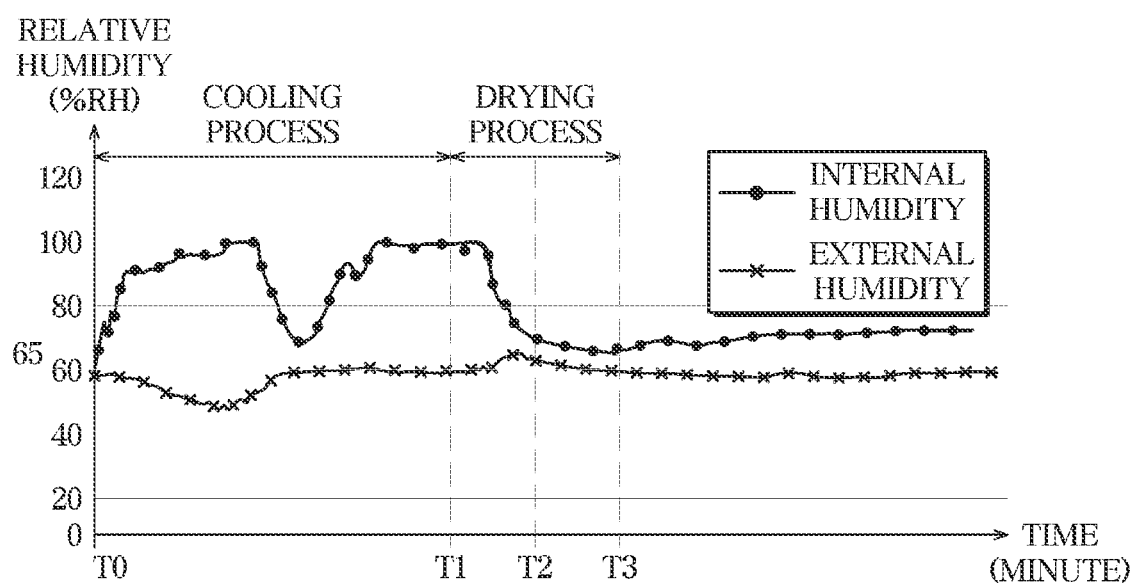
FIG. 15 is a view illustrating another example of an internal humidity of an air conditioner by a drying process illustrated in FIGS. 11 and 12.

FIGS. 11 and 12 are views illustrating an example of a drying process of an air conditioner according to an embodiment. FIG. 13 is a view illustrating an example of an internal humidity of an air conditioner by a drying process illustrated in FIGS. 11 and 12. FIG. 14 is a view illustrating an opening and closing of a door and a rotation speed of a fan by a drying process illustrated in FIGS. 11 and 12. FIG. 15 is a view illustrating another example of an internal humidity of an air conditioner by a drying process illustrated in FIGS. 11 and 12.

Referring to FIGS. 11 to 15, the drying process 1000 of the air conditioner 1 may be described.

The air conditioner 1 may performs the cooling process (1010).

The controller 160 may perform the cooling process in response to the user input for cooling the indoor (air conditioning space).

During the cooling process, the controller 160 may operate the compressor 3 and the fan motor 33 based on the target temperature input by the user and the indoor temperature detected by the temperature sensor 130.

For example, in response to the indoor temperature being higher than the target temperature, the controller 160 may operate the compressor 3 so that the refrigerant passes through the heat exchanger 20 and absorbs heat from the heat exchanger 20, and may operate the fan motor 33 to discharge the air around the cooled heat exchanger 20 into the indoor. In addition, the controller 160 may stop the compressor 3 and operate the fan motor 33 in response to the indoor temperature being lower than the target temperature.

In addition, during the cooling process, the controller 160 may control the fan motor 33 and the door actuator 66 based on the cooling mode selected by the user.

For example, in response to the selection of the first cooling mode by the user, the controller 160 may control the door 60 to open the discharge port 41 and control the fan motor 33 to rotate the fan 32 at the rotation speed set by the user. As illustrated in FIG. 14, the door 60 may be maintained in an open state until a first viewpoint T1 during the cooling process, and the fan 32 may rotate at a first speed.

In addition, in response to selection of the second cooling mode by the user, the controller 160 may control the door 60 to close the discharge port 41 and control the fan motor 33 to rotate the fan 32 at a preset minimum rotation speed.

During the cooling process, the heat exchanger 20 may be cooled by evaporation of the refrigerant, and the air suctioned by the fan 32 may pass through the heat exchanger 20. While passing through the heat exchanger 20, the air may be cooled, and the moisture contained in the air may be condensed on the surface of the heat exchanger 20. In addition, the moisture contained in the air may be condensed in the duct 36 and the grill 34 as well as the heat exchanger 20.

Accordingly, the internal humidity of the air conditioner 1 is very high, as illustrated in FIG. 13, and a relative humidity in the vicinity of the heat exchanger 20 may increase to approximately 100% due to the condensation of moisture on the surface of the heat exchanger 20.

The air conditioner 1 may determine whether the user input for terminating the cooling process is input (1020).

The user may input the user input for terminating the operation of the air conditioner 1 through the remote controller or the user inputter 110. The controller 160 may receive the user input for terminating the cooling process through the user inputter 110.

When the user input for terminating the cooling process is not input (NO in 1020), the air conditioner 1 may continue the cooling process.

When the user input for terminating the cooling process is input (YES in 1020), the air conditioner 1 may stop the compressor 3 (1030).

The controller 160 may identify whether the compressor 3 is operating, and stop the compressor 3 when the compressor 3 is operating. In addition, the controller 160 may maintain the stop of the compressor 3 when the compressor 3 is stopped.

The controller 160 may stop the compressor 3 of the outdoor unit 2. For example, the controller 160 may transmit the control signal for stopping the operation to the compressor 3 of the outdoor unit 2 through communication.

Due to the stop of the compressor 3, the circulation of the refrigerant may be stopped. Accordingly, the cooling of the heat exchanger 20 may be stopped so that vaporization of the refrigerant in the heat exchanger 20 is stopped. In other words, the cooling process may end. For example, as illustrated in FIG. 14, the compressor 3 may be stopped at the first viewpoint T1. Also, the cooling process of the air conditioner 1 may be terminated at the first viewpoint T1.

The air conditioner 1 may open the discharge port 41 (1040).

The controller 160 may identify a position of the door blade 62 in order to identify whether the discharge port 41 is open. When the door blade 62 is located in the open position P1, the controller 160 may identify the open of the discharge port 41 and maintain the open of the discharge port 41.

The controller 160 may control the door 60 to open the discharge port 41 when the door blade 62 is located in the closed position P2. For example, the controller 160 may control the door actuator 66 to move the door blade 62 to the open position P1.

As the discharge port 41 is opened, the first discharging fluid path 41*d* may be opened, and the air flowing by the fan 32 may be discharged to the discharge port 41 through the first discharging fluid path 41*d*.

The air conditioner 1 may operate the fan 32 at the first rotation speed for the first time t1 (1050).

The controller 160 may control the fan motor 33 to rotate the fan 32 at the first rotation speed. For example, as illustrated in FIG. 14, the fan 32 may rotate at the first rotation speed during a first time t1 from a first viewpoint T1 when the cooling process is finished. In this case, the first rotation speed may be the maximum rotation speed of the fan motor 33 or the rotation speed close thereto. For example, the first rotation speed may be approximately 1,100 rpm to 1,200 rpm.

By the rotation of the fan 32, the air is suctioned through the suction port 19 and may pass through the heat exchanger 20. Due to the opening of the discharge port 41, the air may rapidly flow through the first discharging fluid path 41*d* having a small flow resistance. In addition, the air that has passed through the first discharging fluid path 41*d* may be quickly discharged to the outside through the discharge port 41.

As such, the air may quickly pass through the heat exchanger 20. Accordingly, while passing through the heat exchanger 20, the air may separate the moisture on the surface of the heat exchanger 20 from the heat exchanger 20. In other words, due to the rapid flow of air, the moisture on the surface of the heat exchanger 20 may be separated from the heat exchanger 20 and may fall into the drain container provided under the heat exchanger 20. Thereby, the heat exchanger 20 may be quickly dried.

The first time t1 may be set experimentally or empirically. For example, the first time t1 may be set based on a time for separating the moisture condensed on the surface of the heat exchanger 20 from the heat exchanger 20. For example, the first time t1 may be set to 5 minutes.

After the first time t1 has elapsed, the air conditioner 1 may determine whether a time at which the cooling process is performed (hereinafter referred to as 'cooling process time') is less than a reference cooling time (1060).

The controller 160 may calculate the cooling process time using a timer during the cooling process. In addition, the controller 160 may compare the cooling process time with the reference cooling time.

The reference cooling time may be set experimentally or empirically. For example, the reference cooling time may be set based on a time at which the moisture is condensed in the heat exchanger 20 due to the cooling process. For example, the reference cooling time may be set to 10 minutes.

When the cooling process time is less than the reference cooling time (YES in 1060), the air conditioner 1 may determine whether the internal humidity at the end of cooling (hereinafter referred to as 'initial internal humidity') is less than a first reference humidity (1070).

The controller 160 may determine the internal humidity inside the housing 10 based on the output of the second humidity sensor 150 installed inside the housing 10. In particular, when the user input for terminating the cooling process is input, the controller 160 may determine the initial internal humidity based on the output of the second humidity sensor 150. In addition, the controller 160 may compare the initial internal humidity with the first reference humidity.

The first reference humidity may be set experimentally or empirically. For example, the first reference humidity may be set based on the humidity that may be completely dried within a short time by the fan 32 rotating at the maximum rotation speed. The first reference humidity may be set to approximately 60%.

The first reference humidity may vary depending on the external humidity (humidity of the indoor in which the air conditioner is installed). The interior of the air conditioner 1 may be connected to the outside by the suction port 19, the discharge port 41, and the discharging hole 42. Therefore, the internal humidity of the air conditioner 1 is affected by the external humidity (i.e., indoor humidity). For this reason, the air conditioner 1 may perform the drying operation reflecting the external humidity.

Particularly, the first reference humidity may increase as the external humidity increases. For example, as illustrated in FIG. 13, when the external humidity is approximately 40%, the first reference humidity may be set to approximately 60%. In addition, as illustrated in FIG. 15, when the external humidity is approximately 60%, the first reference humidity may be set to approximately 80% by reflecting the external humidity.

The controller 160 may determine the external humidity outside the housing 10 based on the output of the first humidity sensor 140 installed outside the housing 10. In addition, the controller 160 may determine the first reference humidity based on the external humidity.

In addition, in order to perform the drying operation reflecting the external humidity, the air conditioner 1 may perform the drying operation based on a difference between the internal humidity and the external humidity of the air conditioner 1.

For example, in operation 1070, the air conditioner 1 may determine whether the difference between the initial internal humidity and the external humidity is less than the first reference humidity. At this time, the first reference humidity may be set to approximately 20%. The controller 160 may determine the external humidity based on the output of the first humidity sensor 140 and determine the initial internal humidity based on the output of the second humidity sensor 150. The controller 160 may compare the difference between the internal humidity and the external humidity with the first reference humidity.

When the initial internal humidity (or the difference between the initial internal humidity and the external humidity) is less than the first reference humidity (YES in 1070), the air conditioner 1 may operate the fan 32 for a second time at the first rotation speed or the second rotation speed (1080).

When the cooling process time is less than the reference cooling time and the initial internal humidity is less than the first reference humidity, the controller 160 may determine that an amount of moisture condensed on the surface of the heat exchanger 20 is small.

The controller 160 may control the fan motor 33 to rotate the fan 32 at the first rotation speed for the second time in order to quickly finish the drying process.

Alternatively, the controller 160 may control the fan motor 33 to rotate the fan 32 at the second rotation speed for the second time so that the user does not recognize the drying process. In this case, the second rotation speed is smaller than the first rotation speed, and may be the minimum rotation speed of the fan motor 33 or the rotation speed close thereto. For example, the second rotation speed may be approximately 700 rpm to 800 rpm.

After the second time has elapsed, the air conditioner 1 may stop the fan 32 (1090).

Since it is determined that the amount of moisture condensed on the surface of the heat exchanger 20 is small, the controller 160 may determine that the heat exchanger 20, the duct 36, and the grill 34 all dried for the second time. The controller 160 may control the fan motor 33 to stop the fan 32 after the second time has elapsed.

In addition, the operation of the air conditioner 1 may be terminated.

When the cooling process time is greater than the reference cooling time (NO in 1060), or the initial internal humidity (or the difference between the initial internal humidity and external humidity) is greater than the first reference humidity (NO in 1070), the air conditioner 1 may operate the fan 32 at the rotation speed dependent on the internal humidity (1100).

When the cooling process time is greater than the reference cooling time or the initial internal humidity is greater than the first reference humidity, it can be determined that a lot of moisture is contained in the housing 10 including the heat exchanger 20.

In order to completely dry the interior of the air conditioner 1, the controller 160 may change the rotation speed of the fan 32 depending on the internal humidity of the air conditioner 1. For example, the controller 160 may determine the internal humidity of the air conditioner 1 based on the output of the second humidity sensor 150, and may determine the rotation speed of the fan 32 depending on the internal humidity of the air conditioner 1.

As the internal humidity of the air conditioner 1 decreases, the rotation speed of the fan 32 may decrease.

Since the air is discharged to the outside through the heat exchanger 20 by the fan 32 without the compressor 3 being operated, the internal humidity of the air conditioner 1 may decrease after the first viewpoint T1 when the cooling process is finished, as illustrated in FIG. 13. In particular, after the first time t1 in which the fan 32 rotates at the first rotation speed has elapsed, depending on the decrease of the internal humidity of the air conditioner 1, the controller 160 may control the fan motor 33 to reduce the rotation speed of the fan 32. Accordingly, the rotation speed of the fan 32 may be gradually decreased after the first viewpoint T1 when the cooling process is terminated, as illustrated in FIG. 14.

In this way, by changing the rotation speed of the fan 32, a noise due to the rotation of the fan 32 may be reduced, and the heat exchanger 20, the duct 36, and the grill 34 may be efficiently dried.

The air conditioner 1 may determine whether the internal humidity is less than a second reference humidity (1110).

While changing the rotation speed of the fan 32, the controller 160 may determine the internal humidity inside the housing 10 based on the output of the second humidity sensor 150 installed inside the housing 10. In addition, the controller 160 may compare the detected internal humidity with the second reference humidity.

The second reference humidity may be set experimentally or empirically. For example, the second reference humidity may be set based on the humidity that can be dried within a not long time by the fan 32 rotating at the minimum rotation speed. The second reference humidity may be set to approximately 60%.

The second reference humidity may vary depending on the external humidity (indoor humidity in which the air conditioner is installed). For example, the second reference humidity may increase as the external humidity increases. As illustrated in FIG. 13, when the external humidity is approximately 40%, the second reference humidity may be set to approximately 60%. In addition, as illustrated in FIG. 15, when the external humidity is approximately 60%, the second reference humidity may be set to approximately 80% by reflecting the external humidity.

The controller 160 may determine the external humidity of the housing 10 based on the output of the first humidity sensor 140 installed outside the housing 10, and determine the second reference humidity based on the external humidity.

In addition, in order to perform the drying operation reflecting the external humidity, the air conditioner 1 may perform the drying operation based on the difference between the internal humidity and the external humidity of the air conditioner 1.

For example, in operation 1110, the air conditioner 1 may determine whether the difference between the internal humidity and the external humidity is less than the second reference humidity. The controller 160 may compare the difference between the internal humidity and the external humidity with the second reference humidity. At this time, the second reference humidity may be set to approximately 20%.

When the internal humidity is not less than the second reference humidity (NO in 1110), the air conditioner 1 may operate the fan 32 at the rotation speed dependent on the internal humidity.

When the internal humidity is less than the second reference humidity (YES in 1110), the air conditioner 1 may close the discharge port 41 (1120).

As illustrated in FIGS. 13 and 15, the internal humidity of the air conditioner 1 decreases by the operation of the fan 32. When the internal humidity of the air conditioner 1 decreases and the internal humidity becomes less than the second reference humidity, the controller 160 may control the door 60 to close the discharge port 41. For example, the controller 160 may control the door actuator 66 to move the door blade 62 to the closed position P2.

Because the discharge port 41 is closed, the first discharging fluid path 41*d* may be closed, and the air flowing by the fan 32 may be discharged to the discharging hole 42 of the discharging plate 14 through the second discharging fluid path 42*a*.

The air conditioner 1 may operate the fan 32 at the second rotation speed (1130).

The controller 160 may control the fan motor 33 to rotate the fan 32 at the second rotation speed. For example, as illustrated in FIGS. 13 and 15, the internal humidity of the air conditioner 1 may reach the second reference humidity (about 60% in FIG. 13 and about 80% in FIG. 15) at a second viewpoint T2. The controller 160 may control the fan motor 33 to rotate the fan 32 at the second rotation speed at the second viewpoint T2. Accordingly, as illustrated in FIG. 14, after the second viewpoint T2, the fan 32 may rotate at the second rotation speed.

In this case, the second rotation speed is less than the first rotation speed, and may be the minimum rotation speed of the fan motor 33 or the rotation speed close thereto.

Due to a slow rotation of the fan 32 at the second rotation speed, the air may slowly flow by the fan 32. Due to the closing of the discharge port 41, the air may flow slowly through the second discharging fluid path 42*a* having a large flow resistance. In addition, the air passing through the second discharging fluid path 42*a* may be slowly discharged to the outside through the discharging hole 42.

As such, the air may slowly pass through the heat exchanger 20. Thus, the air may pass through an entire heat exchanger 20. For example, when a fluid passes through a specific surface, it is known that a speed of movement of the fluid is inversely proportional to an area through which the fluid passes. In other words, as the speed at which the air moves by the fan 32 increases, the area in which the air contacts the heat exchanger 20 decreases. As the speed at which the air moves by the fan 32 decreases, the area in which the air contacts the heat exchanger 20 increases.

Accordingly, when the discharge port 41 is opened and the fan 32 rotates at the first rotation speed, the air moves rapidly and may only pass through a part of the heat exchanger 20 (a part corresponding to the wing of the fan). On the other hand, when the discharge port 41 is closed and the fan 32 rotates at the second rotation speed, the air moves slowly and may pass through the entire heat exchanger 20.

Accordingly, the discharge port 41 is closed and the fan 32 slowly rotates at the second rotation speed, so that the entire heat exchanger 20 may be dried.

The air conditioner 1 may determine whether the internal humidity is less than a third reference humidity (1140).

While operating the fan 32 at the second rotation speed, the controller 160 may determine the internal humidity inside the housing 10 based on the output of the second humidity sensor 150 installed inside the housing 10. In addition, the controller 160 may compare the detected internal humidity with the third reference humidity.

The third reference humidity may be set experimentally or empirically. For example, the third reference humidity may be set based on the internal humidity when the heat exchanger 20 is approximately completely dried. For example, the third reference humidity may be set to approximately 45%.

The third reference humidity may vary depending on the external humidity (indoor humidity in which the air conditioner is installed). For example, the third reference humidity may increase as external humidity increases. As illustrated in FIG. 13, when the external humidity is approximately 40%, the third reference humidity may be set to approximately 45%. In addition, as illustrated in FIG. 15, when the external humidity is approximately 60%, the third reference humidity may be set to approximately 65% by reflecting the external humidity.

The controller 160 may determine the external humidity outside the housing 10 based on the output of the first humidity sensor 140 installed outside the housing 10, and determine the third reference humidity based on the external humidity.

In addition, in order to perform the drying operation reflecting the external humidity, the air conditioner 1 may perform the drying operation based on the difference between the internal humidity and the external humidity of the air conditioner 1.

For example, in operation 1140, the air conditioner 1 may determine whether the difference between internal humidity and external humidity is less than the second reference humidity. The controller 160 may compare the difference between internal humidity and external humidity with the third reference humidity. In this case, the third reference humidity may be set to approximately 5%.

When the internal humidity is not less than the third reference humidity (NO in 1140), the air conditioner 1 may operate the fan 32 at the second rotation speed.

When the internal humidity is less than the third reference humidity (YES in 1140), the air conditioner 1 may stop the fan 32 (1150).

When the internal humidity of the air conditioner 1 is less than the third reference humidity, it may be determined that the interior of the air conditioner 1 is sufficiently dry. For this reason, the controller 160 may control the fan motor 33 to stop the fan 32.

In addition, the operation of the air conditioner 1 may be terminated.

As described above, the air conditioner 1 may quickly dry the interior of the air conditioner 1 by rapidly flowing the air (first drying operation), and may dry the interior of the air conditioner 1 with a low noise by flowing the air slowly (second drying operation). Accordingly, the drying time perceivable to the user may be shortened, and the air conditioner 1 may dry the interior of the housing 10 with the low noise.

Figure 16:
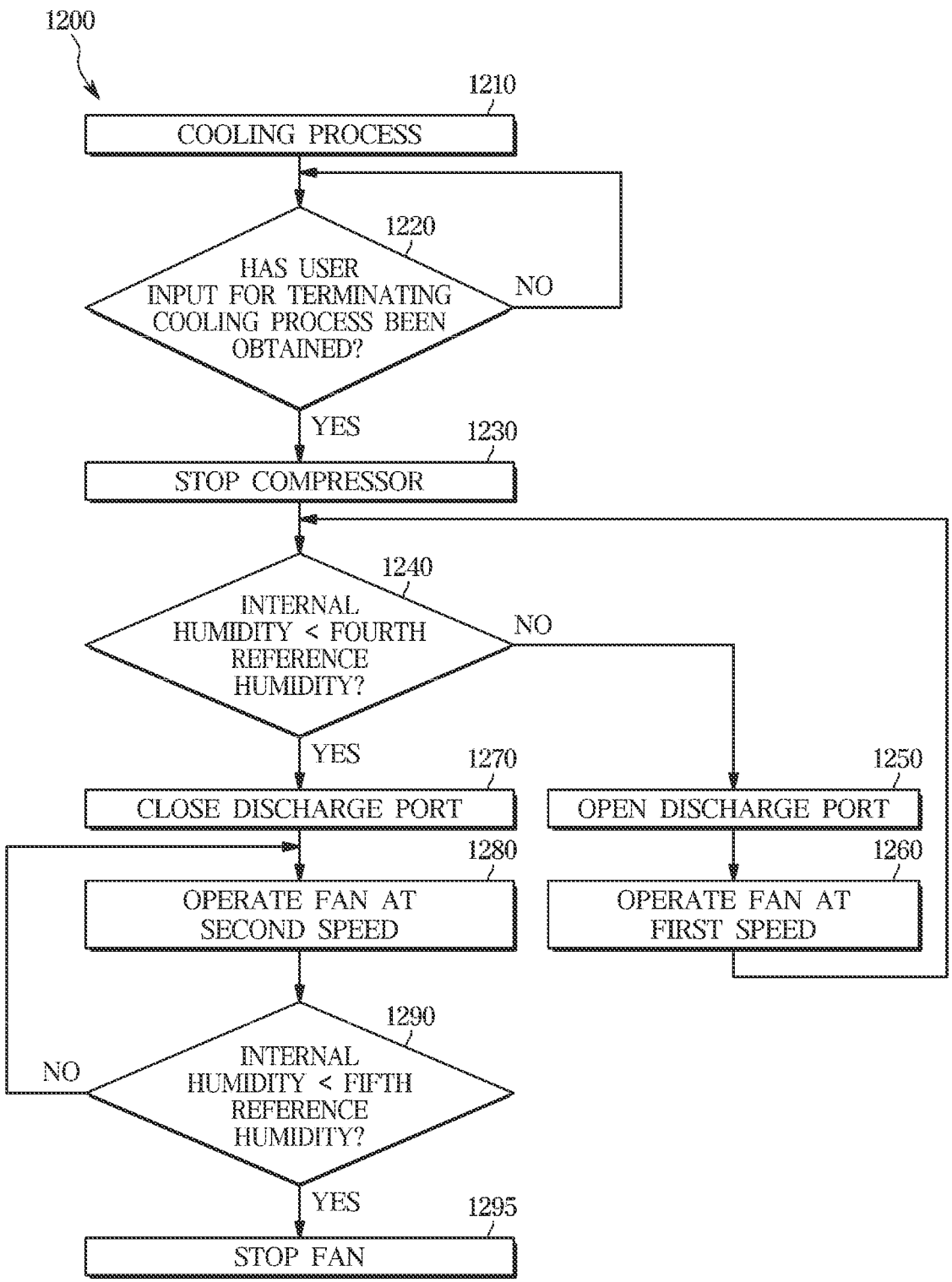
FIG. 16 is a view illustrating another example of a drying process of an air conditioner according to an embodiment.

FIG. 16 is a view illustrating another example of a drying process of an air conditioner according to an embodiment.

Referring to FIG. 16, a drying process 1200 of the air conditioner 1 may be described.

The air conditioner 1 may perform the cooling process (1210). The air conditioner 1 may determine whether the user input for terminating the cooling process is input (1220). When the user input for terminating the cooling process is not input (NO in 1220), the air conditioner 1 may continue the cooling process. When the user input for terminating the cooling process is input (YES in 1220), the air conditioner 1 may stop the compressor 3 (1230).

Operations 1210, 1220, and 1230 may be the same as operations 1010, 1020, and 1030 illustrated in FIG. 11, respectively.

The air conditioner 1 may determine whether the internal humidity is less than a fourth reference humidity (1240).

The controller 160 may determine the internal humidity inside the housing 10 based on the output of the second humidity sensor 150 after stopping the compressor 3. In addition, the controller 160 may compare the detected internal humidity with the fourth reference humidity.

The fourth reference humidity may be set experimentally or empirically. For example, the fourth reference humidity may be set based on the humidity that can be dried within a not long time by the fan 32 rotating at the minimum rotation speed. The fourth reference humidity may be set to approximately 60%.

The fourth reference humidity may vary depending on the external humidity of the air conditioner 1, the controller 160 may determine the external humidity based on the output of the first humidity sensor 140 and set the fourth reference humidity based on the external humidity.

In addition, in order to reflect the external humidity in the drying operation, the air conditioner 1 may determine whether the difference between the internal humidity and the external humidity is less than the fourth reference humidity. In this case, the fourth reference humidity may be set to approximately 20%.

When the internal humidity is not less than the fourth reference humidity (NO in 1240), the air conditioner 1 may open the discharge port 41 (1250).

The controller 160 may identify the opening of the discharge port 41 when the door blade 62 is located in the open position P1. In addition, the controller 160 may control the door 60 to open the discharge port 41 when the door blade 62 is located in the closed position P2.

The air conditioner 1 may operate the fan 32 at the first rotation speed (1260).

The controller 160 may control the fan motor 33 to rotate the fan 32 at the first rotation speed. In this case, the first rotation speed may be the maximum rotation speed of the fan motor 33 or the rotation speed close thereto.

Because the discharge port 41 is opened and the fan 32 rotates rapidly, the air suctioned through the suction port 19 may quickly pass through the heat exchanger 20, and the air that has passed through the heat exchanger 20 may be discharged to the discharge port 41 through the first discharging fluid path 41*d*. Thereby, the heat exchanger 20 may be quickly dried.

While rotating the fan 32 at the first rotation speed, the air conditioner 1 may determine again whether the internal humidity is less than the fourth reference humidity.

When the internal humidity is less than the fourth reference humidity (YES in 1240), the air conditioner 1 may close the discharge port 41 (1270).

The controller 160 may identify the opening of the discharge port 41 when the door blade 62 is located in the closed position P2. In addition, the controller 160 may control the door 60 to close the discharge port 41 when the door blade 62 is located in the open position P1.

The air conditioner 1 may operate the fan 32 at the second rotation speed (1280).

The controller 160 may control the fan motor 33 to rotate the fan 32 at the second rotation speed. In this case, the second rotation speed may be the minimum rotation speed of the fan motor 33 or the rotation speed close thereto.

Because the discharge port 41 is closed and the fan 32 rotates slowly, the air suctioned through the suction port 19 may slowly pass through the heat exchanger 20, and the air that has passed through the heat exchanger 20 may be discharged to the discharging hole 42 through the second discharging fluid path 42*a*. Thereby, the heat exchanger 20 may be completely dried without the noise.

The air conditioner 1 may determine whether the internal humidity is less than a fifth reference humidity (1290).

The controller 160 may determine the internal humidity inside the housing 10 based on the output of the second humidity sensor 150 while rotating the fan 32 at the second rotation speed, and may compare the detected internal humidity with the fifth reference humidity.

The fifth reference humidity may be set experimentally or empirically. For example, the fifth reference humidity may be set based on the internal humidity when the heat exchanger 20 is substantially completely dried. For example, the fifth reference humidity may be set to approximately 45%.

The fifth reference humidity may be varied depending on the external humidity of the air conditioner 1. The controller 160 may determine the external humidity based on the output of the first humidity sensor 140, and set the fifth reference humidity based on the external humidity In addition, in order to reflect the external humidity in the drying operation, the air conditioner 1 may determine whether the difference between the internal humidity and the external humidity is less than the fifth reference humidity. In this case, the fifth reference humidity may be set to approximately 20%.

When the internal humidity is not less than the fifth reference humidity (NO in 1290), the air conditioner 1 may continue rotating the fan 32 at the second rotation speed.

When the internal humidity is less than the fifth reference humidity (YES in 1290), the air conditioner 1 may stop the fan 32 (1295).

When the internal humidity of the air conditioner 1 is less than the fifth reference humidity, it may be determined that the interior of the air conditioner 1 is sufficiently dry, and the controller 160 may control the fan motor 33 to stop the fan 32. Also, the operation of the air conditioner 1 may be terminated.

As described above, the air conditioner 1 may perform the first drying operation or the second drying operation according to the internal humidity of the housing 10. Accordingly, the air conditioner 1 may be shortened the drying time perceivable by the user and may dry the interior of the housing 10 with the low noise.

Figure 17:
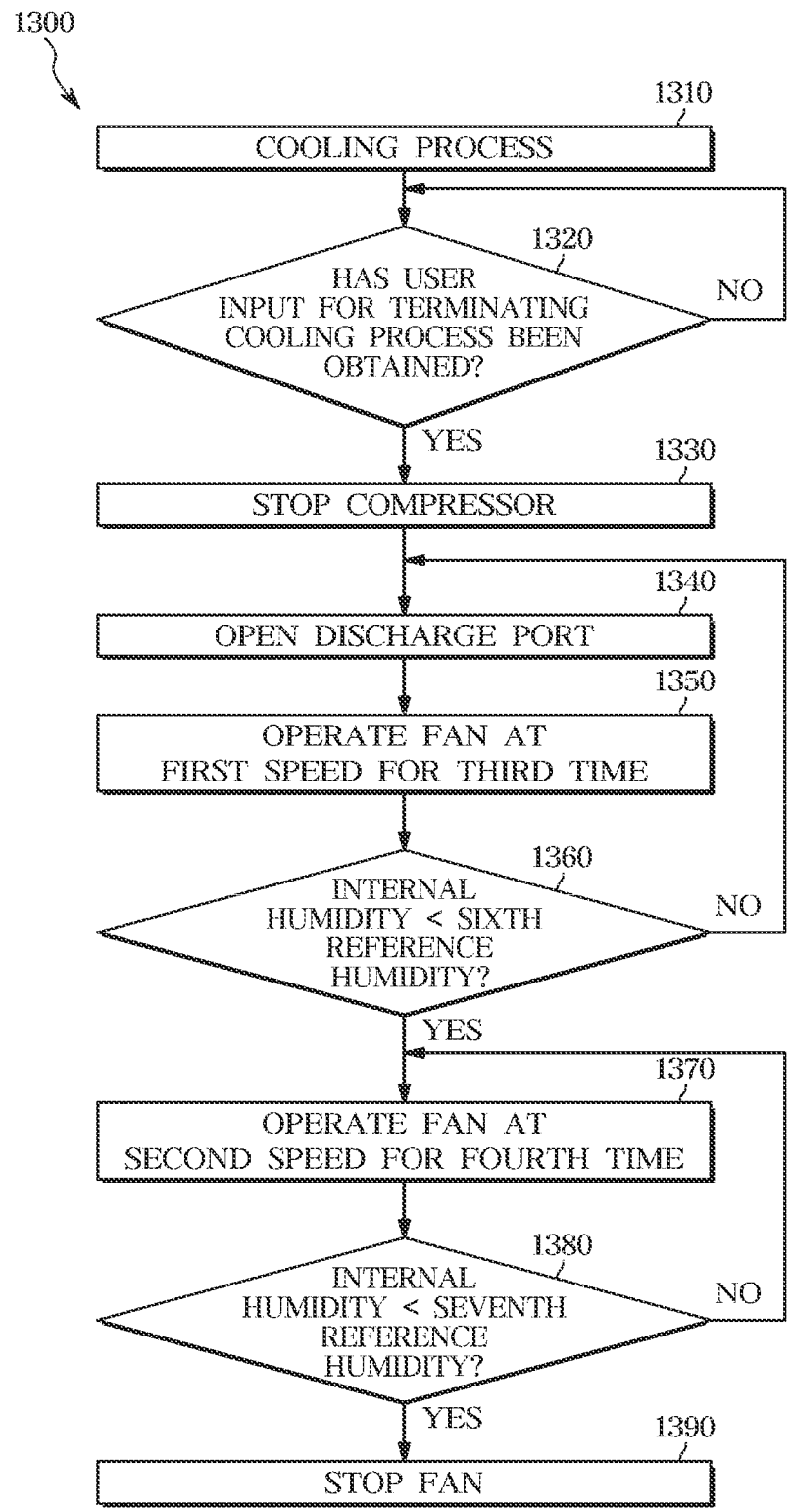
FIG. 17 is a view illustrating another example of a drying process of an air conditioner according to an embodiment.

FIG. 17 is a view illustrating another example of a drying process of an air conditioner according to an embodiment.

Referring to FIG. 17, a drying process 1300 of the air conditioner 1 may be described.

The air conditioner 1 may perform the cooling process (1310). The air conditioner 1 may determine whether the user input for terminating the cooling process is input (1320). When the user input for terminating the cooling process is not input (NO in 1320), the air conditioner 1 may continue the cooling process. When the user input for terminating the cooling process is input (YES in 1320), the air conditioner 1 may stop the compressor 3 (1330).

Operations 1310, 1320, and 1330 may be the same as operations 1010, 1020, and 1030 illustrated in FIG. 11, respectively.

The air conditioner 1 may open the discharge port 41 (1340).

The controller 160 may identify the opening of the discharge port 41 when the door blade 62 is located in the open position P1. In addition, the controller 160 may control the door 60 to open the discharge port 41 when the door blade 62 is located in the closed position P2.

The air conditioner 1 may operate the fan 32 at the first rotation speed for a third time (1350).

The controller 160 may control the fan motor 33 to rotate the fan 32 at the first rotation speed for at least a third time after completion of the cooling operation. In this case, the first rotation speed may be the maximum rotation speed of the fan motor 33 or the rotation speed close thereto.

The third time may be set experimentally or empirically, for example, may be set to about 1 minute.

After the third time has elapsed, the air conditioner 1 may determine whether the internal humidity is less than a sixth reference humidity (1360).

After operating the fan 32 at the first rotation speed for the third time, the controller 160 may determine the internal humidity inside the housing 10 based on the output of the second humidity sensor 150, and may compare the detected internal humidity with the sixth reference humidity.

The sixth reference humidity may be set experimentally or empirically, and may be set to approximately 60%. The sixth reference humidity may be varied depending on the external humidity of the air conditioner 1. In addition, the air conditioner 1 may determine whether the difference between the internal humidity and the external humidity is less than the sixth reference humidity, and the sixth reference humidity may be set to approximately 20%.

When the internal humidity is not less than the sixth reference humidity (NO in 1360), the air conditioner 1 may operate the fan 32 at the first rotation speed for the third time again to dry the interior of the housing 10 using a fast air flow. In other words, the air conditioner 1 may repeat operating the fan 32 at the first rotation speed at the third time unit until the internal humidity reaches the sixth reference humidity.

When the internal humidity is less than the sixth reference humidity (YES in 1360), the air conditioner 1 may operate the fan 32 at the second rotation speed for a fourth time (1370).

The controller 160 may control the fan motor 33 to rotate the fan 32 at the second rotation speed for at least the fourth time. In this case, the second rotation speed is smaller than the first rotation speed, and may be the minimum rotation speed of the fan motor 33 or the rotation speed close thereto.

The fourth time may be set experimentally or empirically, for example, may be set to about 1 minute.

After the fourth time has elapsed, the air conditioner 1 may determine whether the internal humidity is less than a seventh reference humidity (1380).

After operating the fan 32 at the second rotation speed for the fourth time, the controller 160 may determine the internal humidity inside the housing 10 based on the output of the second humidity sensor 150, and may compare the detected internal humidity with the seventh reference humidity.

The seventh reference humidity may be set experimentally or empirically, and may be set to approximately 45%. The seventh reference humidity may be varied depending on the external humidity of the air conditioner 1. In addition, the air conditioner 1 may determine whether the difference between the internal humidity and the external humidity is less than the seventh reference humidity, and the seventh reference humidity may be set to approximately 5%.

When the internal humidity is not less than the seventh reference humidity (NO in 1380), the air conditioner 1 may operate the fan 32 at the second rotation speed for the fourth time again to dry the interior of the housing 10 using the fast air flow. In other words, the air conditioner 1 may repeat operating the fan 32 at the second rotation speed at fourth third time unit until the internal humidity reaches the seventh reference humidity.

When the internal humidity is less than the seventh reference humidity (YES in 1380), the air conditioner 1 may stop the fan 32 (1390).

When the internal humidity of the air conditioner 1 is less than the seventh reference humidity, it may be determined that the interior of the air conditioner 1 is sufficiently dry, and the controller 160 may control the fan motor ee to stop the fan 32. Also, the operation of the air conditioner 1 may be terminated.

As described above, the air conditioner 1 does not open and close the discharge port 41, and may gradually reduce the rotation speed of the fan 32 in accordance with the decrease in the internal humidity. Accordingly, the drying inside the air conditioner 1 is efficiently performed, and the noise due to high-speed rotation of the fan 32 may be reduced.

Figure 18:
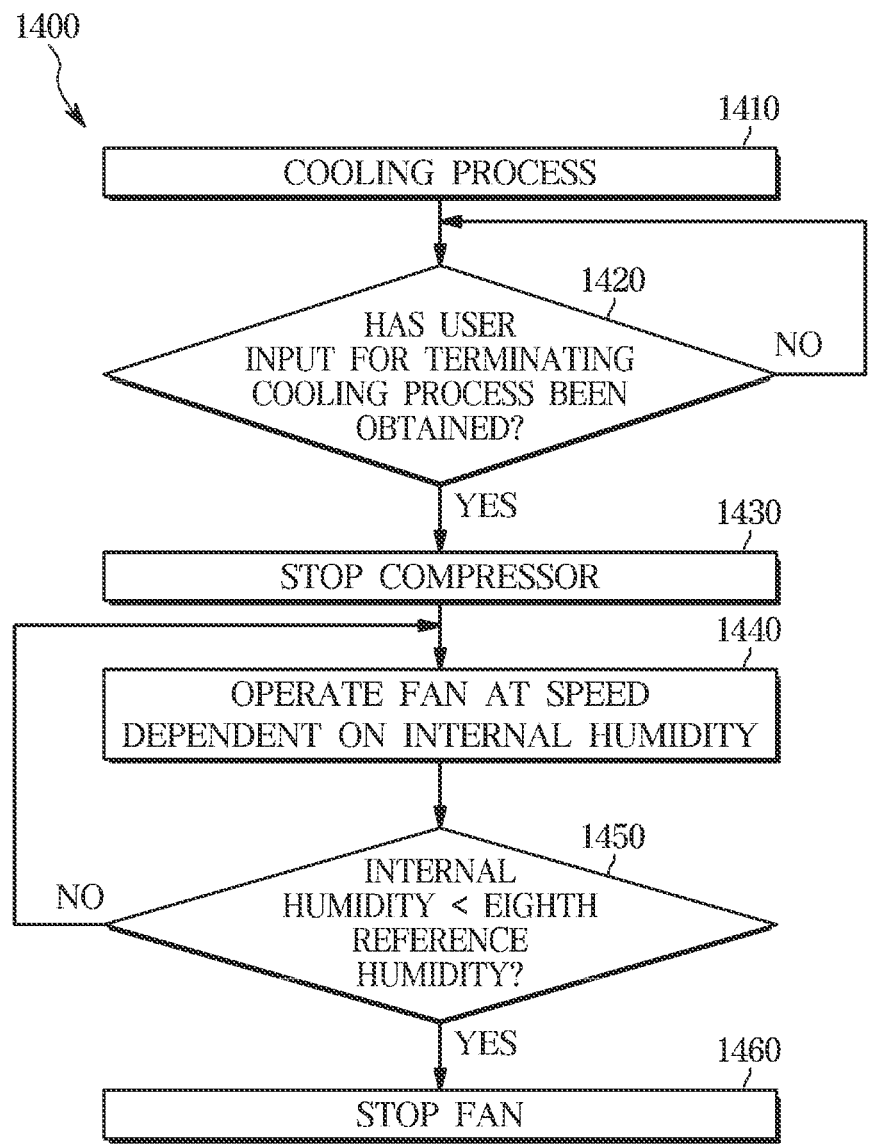
FIG. 18 is a view illustrating another example of a drying process of an air conditioner according to an embodiment.

FIG. 18 is a view illustrating another example of a drying process of an air conditioner according to an embodiment.

Referring to FIG. 18, a drying process 1400 of the air conditioner 1 may be described.

The air conditioner 1 may perform the cooling process (1410). The air conditioner 1 may determine whether the user input for terminating the cooling process is input (1420). When the user input for terminating the cooling process is not input (NO in 1420), the air conditioner 1 may continue the cooling process. When the user input for terminating the cooling process is input (YES in 1420), the air conditioner 1 may stop the compressor 3 (1430).

Operations 1410, 1420, and 1430 may be the same as operations 1010, 1020, and 1030 illustrated in FIG. 11, respectively.

The air conditioner 1 may operate the fan 32 at the rotation speed dependent on the internal humidity (1440).

In order to completely dry the interior of the air conditioner 1, the controller 160 may change the rotation speed of the fan 32 depending on the internal humidity of the air conditioner 1. For example, the controller 160 may determine the internal humidity of the air conditioner 1 based on the output of the second humidity sensor 150, and may determine the rotation speed of the fan 32 depending on the internal humidity of the air conditioner 1.

The internal humidity of the air conditioner 1 decreases by the operation of the fan 32, and the rotation speed of the fan 32 may decrease as the internal humidity of the air conditioner 1 decreases. As such, by changing the rotation speed of the fan 32, the noise caused by the rotation of the fan 32 is reduced, and the heat exchanger 20, the duct 36, the grill 34, and the like may be efficiently dried.

The air conditioner 1 may determine whether the internal humidity is less than an eighth reference humidity (1450).

While rotating the fan 32, the controller 160 may determine the internal humidity inside the housing 10 based on the output of the second humidity sensor 150, and may compare the detected internal humidity with the eighth reference humidity.

The eighth reference humidity may be set experimentally or empirically, and may be set to approximately 45%. The eighth reference humidity may be varied depending on the external humidity of the air conditioner 1. In addition, the air conditioner 1 may determine whether the difference between the internal humidity and the external humidity is less than the eighth reference humidity, and the eighth reference humidity may be set to approximately 5%.

When the internal humidity is not less than the eighth reference humidity (NO in 1450), the air conditioner 1 may continue to operate the fan 32 at the rotation speed dependent on the internal humidity.

When the internal humidity is less than the eighth reference humidity (YES in 1450), the air conditioner 1 may stop the fan 32 (1460).

When the internal humidity of the air conditioner 1 is less than the eighth reference humidity, it may be determined that the interior of the air conditioner 1 is sufficiently dry, and the controller 160 may control the fan motor to stop the fan 32. Also, the operation of the air conditioner 1 may be terminated.

As described above, the air conditioner 1 does not open and close the discharge port 41, and may linearly reduce the rotation speed of the fan 32 in accordance with the decrease in the internal humidity. Accordingly, the drying inside the air conditioner 1 is efficiently performed, and the noise due to high-speed rotation of the fan 32 may be reduced.

Figure 19:
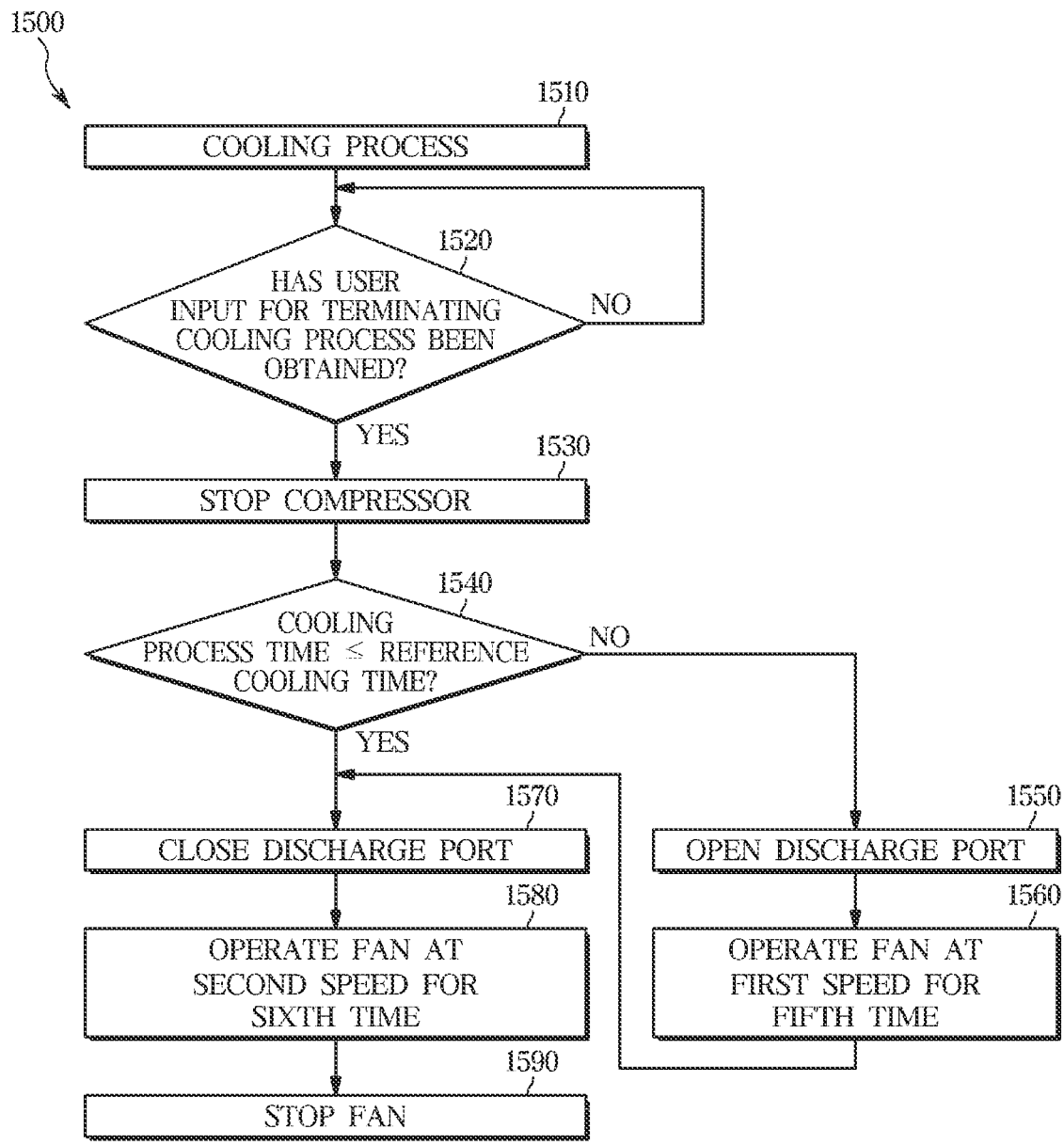
FIG. 19 is a view illustrating another example of a drying process of an air conditioner according to an embodiment.

FIG. 19 is a view illustrating another example of a drying process of an air conditioner according to an embodiment.

Referring to FIG. 19, a drying process 1500 of the air conditioner 1 may be described.

The air conditioner 1 may perform the cooling process (1510). The air conditioner 1 may determine whether the user input for terminating the cooling process is input (1520). When the user input for terminating the cooling process is not input (NO in 1520), the air conditioner 1 may continue the cooling process. When the user input for terminating the cooling process is input (YES in 1520), the air conditioner 1 may stop the compressor 3 (1530).

Operations 1510, 1520, and 1530 may be the same as operations 1010, 1020, and 1030 illustrated in FIG. 11, respectively.

The air conditioner 1 may determine whether the time at which the cooling process is performed (hereinafter referred to as 'cooling process time') is less than the reference cooling time (1540).

The controller 160 may calculate the cooling process time using the timer during the cooling process, and compare the cooling process time with the reference cooling time. The reference cooling time may be set experimentally or empirically, for example 10 minutes.

When the cooling process time is not less than the reference cooling time (NO in 1540), the air conditioner 1 may open the discharge port 41 (1550).

The controller 160 may identify the opening of the discharge port 41 when the door blade 62 is located in the open position P1. In addition, the controller 160 may control the door 60 to open the discharge port 41 when the door blade 62 is located in the closed position P2.

The air conditioner 1 may operate the fan 32 at the first rotation speed for a fifth time (1560).

The controller 160 may control the fan motor 33 to rotate the fan 32 at the first rotation speed for the fifth time. In this case, the first rotation speed may be the maximum rotation speed of the fan motor 33 or the rotation speed close thereto.

The fifth time may be set experimentally or empirically. For example, the fifth time may be set based on the time for separating moisture condensed on the surface of the heat exchanger 20 from the heat exchanger 20. The fifth time may be set to 5 minutes, for example.

When the cooling process time is greater than or equal to the reference cooling time, it may be determined that the large amount of moisture is condensed on the surface of the heat exchanger 20. Accordingly, in order to quickly remove the moisture from the surface of the heat exchanger 20, the air conditioner 1 may open the discharge port 41 and rotate the fan 32 at the first rotation speed. In this way, since the discharge port 41 is opened and the fan 32 rotates rapidly, the air conditioner 1 may quickly dry the heat exchanger 20.

When the cooling process time is less than the reference cooling time (YES in 1540), the air conditioner 1 may close the discharge port 41 (1570). In addition, when the fifth time elapses after the fan 32 is operated at the first rotation speed, the air conditioner 1 may close the discharge port 41.

The controller 160 may identify the closing of the discharge port 41 when the door blade 62 is located in the closed position P2. In addition, the controller 160 may control the door 60 to open the discharge port 41 when the door blade 62 is located in the open position P1.

The air conditioner 1 may operate the fan 32 at the second rotation speed for a sixth time (1580).

The controller 160 may control the fan motor 33 to rotate the fan 32 at the second rotation speed for the sixth time. In this case, the second rotation speed may be the minimum rotation speed of the fan motor 33 or the rotation speed close thereto.

The sixth time may be set experimentally or empirically. For example, the sixth time may be set based on the time for completely drying the moisture condensed on the surface of the heat exchanger 20. The sixth time may be set to 10 minutes, for example.

When the cooling process time is less than the reference cooling time, it may be determined that a small amount of moisture is condensed on the surface of the heat exchanger 20. Accordingly, in order to remove the moisture on the surface of the heat exchanger 20 without the noise, the air conditioner 1 may close the discharge port 41 and rotate the fan 32 at the second rotation speed. In this way, because the discharge port 41 is closed and the fan 32 rotates slowly, the air conditioner 1 may quietly dry the heat exchanger 20.

After the sixth time has elapsed, the air conditioner 1 may stop the fan 32 (1590).

When the internal humidity of the air conditioner 1 is less than the eighth reference humidity, it may be determined that the interior of the air conditioner 1 is sufficiently dry, and the controller 160 may control the fan motor 33 to stop the fan 32. Also, the operation of the air conditioner 1 may be terminated.

As described above, the air conditioner 1 may perform the first drying operation or the second drying operation depending on the cooling time. Accordingly, the air conditioner 1 may shorten the drying time perceivable by the user and may dry the interior of the housing 10 with the low noise.

The air conditioner 1 may include the housing 10 in which the discharge port 41 and the plurality of holes 42 are formed, the door 60 capable of closing the discharge port 41, the heat exchanger 20 provided in the housing 10, the compressor 3 connected to the heat exchanger 20 to circulate the refrigerant to pass through the heat exchanger 20, the fan 32 for blowing the air so that the air passes through the heat exchanger 20 and is discharged through at least one of the discharge port 41 and the plurality of holes 42, the humidity sensor 150 provided in the housing 10 to detect the humidity of the air passing through the heat exchanger 20, and the controller 160 for controlling the door 60 to open or close the discharge port 41 and the rotation speed of the fan 32 based on the humidity detected by the humidity sensor 150 while the compressor 3 is stopped.

Accordingly, the air conditioner 1 may quickly dry the heat exchanger 20 or dry the heat exchanger 20 without the noise depending on the humidity in the housing 10.

After stopping the compressor 3, the controller 160 may control the door 20 to open the discharge port 41 and control the fan 32 to rotate at the first rotation speed.

Accordingly, the air conditioner 1 may quickly remove the moisture condensed on the heat exchanger 20.

When the humidity detected by the humidity sensor 150 while controlling the fan 32 to rotate at the first rotation speed is less than the first reference humidity, the controller 160 may control the door 60 to close the discharge port 41, and may control the fan 32 to rotate at the second rotation speed smaller than the first rotation speed.

Accordingly, the air conditioner 1 may dry the entire heat exchanger 20 and may also dry the interior of the housing 10 without the noise.

When the humidity detected by the humidity sensor 150 is greater than the first reference humidity while controlling the fan 32 to rotate at the first rotation speed, the controller 160 may control the fan 32 to rotate at the rotation speed depending on the detected humidity.

Accordingly, the air conditioner 1 may efficiently dry the interior of the housing 10 with the low noise.

When the humidity detected by the humidity sensor 150 is less than the first reference humidity, the controller 160 may control the door 60 to close the discharge port 41, and may control the fan 32 to rotate at the second rotation speed.

Accordingly, the air conditioner 1 may dry the entire heat exchanger 20 and may also dry the interior of the housing 10 without the noise.

When the humidity detected by the humidity sensor 150 is greater than the first reference humidity, the controller 160 may control the door 60 to open the discharge port 41 and control the fan 32 to rotate at the first rotation speed greater than the second rotation speed.

Accordingly, the air conditioner 1 may quickly remove the moisture condensed on the heat exchanger 20.

When the humidity detected by the humidity sensor 150 is greater than the first reference humidity, the controller 160 may control the door 60 to open the discharge port 41 and control the fan 32 to rotate at the rotation speed depending on the detected humidity.

Accordingly, the air conditioner 1 may efficiently dry the interior of the housing 10 with the low noise.

The air conditioner 1 may include the housing 10, the heat exchanger 20 provided in the housing 10, the compressor 3 connected to the heat exchanger 20 to circulate the refrigerant to pass through the heat exchanger 20, the fan 32 for blowing the air so that the air passes through the heat exchanger 20, the humidity sensor 150 provided in the housing 10 to detect the humidity of the air passing through the heat exchanger 20, and the controller 160 for rotating the fan 32 at different rotation speed based on the humidity detected by the humidity sensor 150 while the compressor 3 is stopped.

Accordingly, the air conditioner 1 may quickly dry the heat exchanger 20 or dry the heat exchanger 20 without the noise depending on the humidity in the housing 10.

After stopping the compressor 3, the controller 160 may control the fan 32 to rotate at the first rotation speed.

Accordingly, the air conditioner 1 may quickly remove the moisture condensed on the heat exchanger 20.

When the humidity detected by the humidity sensor 150 while controlling the fan 32 to rotate at the first rotation speed is less than the first reference humidity, the controller 160 may control the fan 32 to rotate at the second rotation speed smaller than the first rotation speed.

Accordingly, the air conditioner 1 may dry the entire heat exchanger 20 and may also dry the interior of the housing 10 without the noise.

The controller 160 may control the fan 32 to rotate at the second rotation speed when the humidity detected by the humidity sensor 150 is smaller than the first reference humidity.

Accordingly, the air conditioner 1 may dry the entire heat exchanger 20 and may also dry the interior of the housing 10 without the noise.

When the humidity detected by the humidity sensor 150 is greater than the first reference humidity, the controller 160 may control the fan 32 to rotate at the first rotation speed greater than the second rotation speed.

Accordingly, the air conditioner 1 quickly removes the moisture condensed on the heat exchanger 20.

The disclosed embodiments may be implemented in the form of a recording medium storing computer-executable instructions that are executable by a processor. The instructions may be stored in the form of a program code, and when executed by a processor, the instructions may generate a program module to perform operations of the disclosed embodiments. The recording medium may be implemented non-transitory as a computer-readable recording medium.

The non-transitory computer-readable recording medium may include all kinds of recording media storing commands that can be interpreted by a computer. For example, the non-transitory computer-readable recording medium may be, for example, ROM, RAM, a magnetic tape, a magnetic disc, flash memory, an optical data storage device, etc.

Embodiments of the disclosure have thus far been described with reference to the accompanying drawings. It should be obvious to a person of ordinary skill in the art that the disclosure may be practiced in other forms than the embodiments as described above without changing the technical idea or essential features of the disclosure. The above embodiments are only by way of example, and should not be interpreted in a limited sense.

What is claimed is:

1. An air conditioner comprising:
a housing having a discharge port and a plurality of holes;
a door configured to open or close the discharge port;
a heat exchanger provided in the housing;
a compressor to be connected to the heat exchanger, the compressor being configured to circulate a refrigerant to pass through the heat exchanger;
a fan configured to move air inside the housing such that the air passes through the heat exchanger and is discharged through at least one of the discharge port and the plurality of holes;
a humidity sensor provided in the housing, the humidity sensor being configured to detect a humidity of the air that passes through the heat exchanger; and
a controller configured to, based on the humidity detected by the humidity sensor while the compressor is stopped:
control the door to open or close the discharge port, and
control a rotation speed of the fan so that the fan rotates at different rotation speeds based on different humidities detected by the humidity sensor inside the housing,
wherein the controller is configured to control the door to open the discharge port and control the rotation speed of the fan so that the fan rotates at a first rotation speed after stopping the compressor, and
wherein, based on the humidity detected by the humidity sensor being less than a first reference humidity while the fan is rotating at the first rotation speed, the controller is configured to control the door to close the discharge port and control the rotation speed of the fan so that the fan rotates at a second rotation speed less than the first rotation speed.

2. The air conditioner according to claim 1, wherein, based on the humidity detected by the humidity sensor being greater than the first reference humidity while the fan is rotating at the first rotation speed, the controller is configured to control the rotation speed of the fan so that the fan rotates at a rotation speed dependent on the humidity detected by the humidity sensor.

3. The air conditioner according to claim 1, wherein, based on the humidity detected by the humidity sensor being greater than the first reference humidity, the controller is configured to control the door to open the discharge port and control the rotation speed of the fan so that the fan rotates at the first rotation speed.

4. The air conditioner according to claim 1, wherein, based on the humidity detected by the humidity sensor being greater than the first reference humidity, the controller is configured to control the door to open the discharge port and control the rotation speed of the fan so that the fan rotates at a rotation speed dependent on the humidity detected by the humidity sensor.

5. The air conditioner according to claim 1, wherein, based on a closing of the discharge port, the air blown by the fan is discharged through the plurality of holes.

6. A method of controlling an air conditioner, the air conditioner including a housing having a discharge port and a plurality of holes, the method comprising:

operating a compressor such that a refrigerant passes through a heat exchanger provided in the housing;
rotating a fan such that air passes through the heat exchanger while the compressor is operating;
stopping the compressor in response to a user input to stop the compressor; and
opening and closing the discharge port and controlling a rotation speed of the fan, by a controller, so that the fan operates at a plurality of rotation speeds based on different humidities, in the air passing through the heat exchanger, that are detected by a humidity sensor in the housing, while the compressor is stopped,
wherein the opening and closing the discharge port and the controlling the rotation speed of the fan comprises:
opening the discharge port and controlling the rotation speed of the fan so that the fan rotates at a first rotation speed after stopping the compressor, and
closing the discharge port and controlling the rotation speed of the fan so that the fan rotates at a second rotation speed less than the first rotation speed based on the humidity detected by the humidity sensor being less than a first reference humidity.

7. The method according to claim 6, wherein the opening or closing the discharge port and the controlling of the rotation speed of the fan further comprises:
controlling the rotation speed of the fan so that the fan rotates at a rotation speed dependent on the humidity detected by the humidity sensor, based on the humidity detected by the humidity sensor being greater than the first reference humidity.

8. The method according to claim 6, wherein the opening and closing the discharge port and the controlling of the rotation speed of the fan further comprises:
opening the discharge port and controlling the rotation speed of the fan so that the fan rotates at the first rotation speed based on the humidity detected by the humidity sensor being greater than the first reference humidity.

9. The method according to claim 6, wherein the opening or closing the discharge port and the controlling of the rotation speed of the fan further comprises:
opening the discharge port and controlling the rotation speed of the fan so that the fan rotates at a rotation speed dependent on the humidity detected by the humidity sensor, based on the humidity detected by the humidity sensor being greater than the first reference humidity.

10. An air conditioner comprising:
a housing;
a heat exchanger provided in the housing;
a compressor to be connected to the heat exchanger, the compressor being configured to circulate a refrigerant to pass through the heat exchanger;
a fan configured to move air inside the housing such that the air passes through the heat exchanger;
a humidity sensor provided in the housing, the humidity sensor being configured to detect a humidity of the air that passes through the heat exchanger; and
a controller configured to control a rotation speed of the fan so that the fan rotates at different rotation speeds based on different humidities detected by the humidity sensor inside the housing while the compressor is stopped,
wherein the controller is configured to control the rotation speed of the fan so that the fan rotates at a first rotation speed after stopping the compressor, and wherein, based on the humidity detected by the humidity sensor being less than a first reference humidity while the fan rotates at the first rotation speed, the controller is configured to control the rotation speed of the fan so that the fan rotates at a second rotation speed less than the first rotation speed.

11. The air conditioner according to claim 10, wherein, based on the humidity detected by the humidity sensor being greater than the first reference humidity, the controller is configured to control the rotation speed of the fan so that the fan rotates at the first rotation speed.

* * * * *